United States Patent
Altintas et al.

(10) Patent No.: US 10,785,662 B2
(45) Date of Patent: Sep. 22, 2020

(54) CLOUD-BASED NETWORK OPTIMIZER FOR CONNECTED VEHICLES

(71) Applicant: TOYOTA JIDOSHA KABUSHIKI KAISHA, Toyota-shi, Aichi-ken (JP)

(72) Inventors: Onur Altintas, Mountain View, CA (US); Takamasa Higuchi, Mountain View, CA (US)

(*) Notice: Subject to any disclaimer, the term of this patent is extended or adjusted under 35 U.S.C. 154(b) by 72 days.

(21) Appl. No.: 15/958,925

(22) Filed: Apr. 20, 2018

(65) Prior Publication Data
US 2019/0327619 A1   Oct. 24, 2019

(51) Int. Cl.
| | |
|---|---|
| H04W 24/02 | (2009.01) |
| G06N 7/00 | (2006.01) |
| H04W 4/02 | (2018.01) |
| H04W 24/08 | (2009.01) |
| H04W 48/08 | (2009.01) |
| H04W 48/18 | (2009.01) |

(52) U.S. Cl.
CPC ........... *H04W 24/02* (2013.01); *G06N 7/005* (2013.01); *H04W 4/02* (2013.01); *H04W 24/08* (2013.01); *H04W 48/08* (2013.01); *H04W 48/18* (2013.01)

(58) Field of Classification Search
None
See application file for complete search history.

(56) References Cited

U.S. PATENT DOCUMENTS

| | | |
|---|---|---|
| 2011/0070838 A1 | 3/2011 | Caulfield |
| 2018/0063852 A1* | 3/2018 | Kang .................... H04W 72/10 |
| 2018/0261093 A1* | 9/2018 | Xu ........................ B60W 10/20 |
| 2019/0191442 A1* | 6/2019 | Lu ........................ H04W 36/26 |

FOREIGN PATENT DOCUMENTS

| | | |
|---|---|---|
| JP | 2007-221339 | 8/2007 |
| JP | 2009-200773 | 9/2009 |
| JP | 2017-175296 | 9/2017 |

OTHER PUBLICATIONS

JPO, Office Action for Japanese Patent Application No. 2019-065573, 5 pages, dated Mar. 10, 2020.
Huang, Xin Lin et al., "Historical Spectrum Sensing Data Mining for Cognitive Radio Enabled Vehicular Ad-Hoc Networks," IEEE Transactions on Dependable and Secure Computing, vol. 13, No. 1, Jan. 1, 2016, pp. 59-70.
EPO, Extended European Search Report for European Patent Application No. 19170035.0, dated Jul. 4, 2019, 12 pages.

\* cited by examiner

*Primary Examiner* — Chi H Pham
*Assistant Examiner* — Raul Rivas
(74) *Attorney, Agent, or Firm* — Burbage Law, P.C.; Jon-Michael Burbage; Elizabeth Ruzich

(57) ABSTRACT

The disclosure includes embodiments for providing cloud-based network optimization for connected vehicles. In some embodiments, a method includes receiving, by a connected vehicle, configuration data describing a set of candidate vehicle-to-anything (V2X) channels of a V2X radio of the connected vehicle and configuration selection probability values describing a likelihood that particular candidate V2X channels of the set will be selected. In some embodiments, the method includes selecting a V2X channel from the set that does not have the highest likelihood of being selected. In some embodiments, the method includes configuring the V2X radio of the connected vehicle to transmit data packets using the selected V2X channel.

20 Claims, 14 Drawing Sheets

In some embodiments, the statistics analyzer analyzes the report data to determine digital data describing the following example statistical information:

Expected number of vehicles $n_j(t)$

Analyze the history of vehicle positions to derive the expected number of vehicles in a geographic region "j" over a target time frame "t" (e.g., 7am-8am on weekdays). For example, approximate the expected number of vehicles by the average number of vehicles in a particular geographic region at the corresponding time frames.

Expected data transmission rate $\tau_{i,j}(t)$

Analyze the history of packet transmission rate and packet size, reported by individual vehicles, and define $\tau_{i,j}$ by a product of average packet transmission rate on radio i and average packet size for all the vehicles in a sub-region j.

Expected channel load $y_{i,j}(t)$

Analyze the history of channel load measurements to calculate average channel busy ratio on radio i in each geographic region j.

Figure 7

In some embodiments, the external load estimator analyzes the statistical information to estimate external channel load "$\alpha_{i,j}$" on radio "i" in each geographical region j. For example, the external load estimator subtracts the average channel load that is generated by controllable vehicles from the total channel load "$\gamma_{i,j}$" as shown below:

$$\alpha_{i,j}(t) = \gamma_{i,j}(t) - \sum_{k \in \mathcal{A}} \delta_i(j,k) v_k(t) \tau_{i,k}(t) / d_i$$

- $\mathcal{A}$ : a set of all the geographic regions
- $\delta_i(j,k)$ : a binary function that returns 1 if the centers of geographical regions j and k are within the maximum interference distance of the radio i; otherwise it returns 0
- $d_i$ : data rate of radio i

Figure 8

In some embodiments, the radio configuration optimizer specifies configuration selection probabilities for each candidate configuration

- In the following example, each candidate radio configuration specifies a type of radio that should be used to transmit data packets:
  - $S_j = [p_{1,j}, p_{2,j}, \ldots, p_{n,j}]$
  - $n$ is the number of candidate radio configurations
  - $i$-th element $p_{i,j}$ denotes probability that vehicles in a geographic region $j$ select the $i$-th, e.g., radio$_j$
  - $\sum_i p_{i,j} = 1$ In some embodiments, the radio configuration optimizer uses a linear programming algorithm to optimize the configuration selection probabilities $p_{i,j}$ in interface selection vectors $S_j$. The radio configuration optimizer also optimizes a set of configuration selection probabilities for all the geographic regions to maximize the residual channel load $1 - l_{i,j}$ experienced in all the geographic regions $j$ and for all the available interfaces "I" using the following analysis:

$$\text{maximize} \min_{i \in \mathcal{R}, j \in \mathcal{A}} (1 - l_{i,j}) d_i$$

Figure 9

In some embodiments, the radio configuration optimizer optimizes the probabilities $p_{i,k}$ in the radio selection vector by the following analysis:

Objective function:

(1) $\underset{i \in R, j \in A}{\text{maximize min}} \underbrace{(1 - l_{i,j}) d_i}_{\text{Channel load on radio or channel "i" in region "j"}}$ ← 901

Constraints:

(2) $\forall i \in R, \forall j \in A: l_{i,j} = \underbrace{\alpha_{i,j}}_{\text{Channel occupancy by non-vehicle nodes}} + \sum_{k \in A} \delta_{i,j}(j,k) \, p_{i,k} v_k \tau_k / d_i$    Expected proportion of time, when radio/channel "i" is occupied by vehicles in geographic region "k"

$\tau_k = \sum_{i \in R} \tau_{i,k}$ (3) $\forall j \in A: \sum_{i \in R} p_{i,j} = 1$    Probability that vehicles in geographic region k selects interface i (4) $\forall i \in R, \forall j \in A: 0 \le p_{i,j} \le 1$ A set of radio types such as included in the V2X radio of the vehicle

Figure 10

BSM DATA 197

- Vehicles and other client devices equipped with Dedicated Short Range Communication ("DSRC") transmit a Basic Safety Message ("BSM") at a regular interval.

- Each BSM includes the following BSM data describing one or more of the following for the vehicle that originally sent the BSM:
    (1) GPS Data Describing the Location of the Vehicle, where the GPS Data may be so accurate that it describes the specific parking space the Vehicle is parked in;
    (2) Heading Data Describing a past Direction of travel for the Vehicle, if any;
    (3) Velocity Data Describing a past Velocity of the Vehicle; and
    (4) Path History of Vehicle (e.g., path history data).

Figure 11

BSM DATA 197

Part 1

GPS Data (local 3D)
- Latitude
- Longitude
- Elevation
- Positional accuracy
- Time Vehicle Motion Data
- Transmission state
- Speed
- Heading
- Steering wheel angle
- Acceleration set (4-way, i.e., 3 axes of acceleration plus yaw rate
- Brake system status Vehicle Size Data

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle Type
Configuration Data

Figure 12

CLOUD-BASED NETWORK OPTIMIZER FOR CONNECTED VEHICLES

BACKGROUND

The specification relates to providing cloud-based network optimization for connected vehicles.

Connected vehicles have access to many different radio types such as the following: Dedicated Short-Range Communication (DSRC); Long-Term Evolution (LTE); wireless fidelity (WiFi); and millimeter wave (mmWave). Each radio type performs differently in different situations. There are existing solutions which seek to help connected vehicles select an optimal radio type to use, but these have major deficiencies.

SUMMARY

There are existing solutions which use a cloud server to collect network data, determine optimum radio types for different geographic regions and they provide data to connected vehicles which specify the optimum radio type. All the different connected vehicles within the geographic region then use the optimum radio type. These existing solutions have three deficiencies which make them inadequate for use in the real-world. First, the existing solutions do not consider external channel load and resource demand when determining optimum radio types, and as a result, frequently the radio type which is designated as being optimum is actually not optimum. Second, the existing solutions define an optimum radio type and then require all connected vehicles to use this optimum radio type, which results in channel congestion and poor performance by the radio type designated as optimum. Third, the existing solutions do not consider the need or benefit of globally configuring which radio types are used within each geographic region with the goal of maximizing the residual channel load experienced for each radio type in all the geographic regions.

Described herein are embodiments of a network optimizer operable on a server and embodiments of a configuration selector installed in an onboard unit of a connected vehicle.

In some embodiments, the network optimizer builds a database that describes information about different radio types (e.g., DSRC, LTE, Wi-Fi, mmWave, etc.) in different geographic locations at different times. The network optimizer analyzes one or more instances of report data that are received from various vehicles and determines, for each of the geographic regions at different times: (1) the amount of traffic generated by non-vehicle wireless devices [i.e., "external channel load"]; and (2) the amount of network traffic generated by controllable vehicles [i.e., "resource demand"]. The network optimizer analyzes the external channel load and the resource demand, as well as the other data included in the database, to generate a set of candidate radio configurations for each geographic region. The set of candidate radio configurations describes two or more different radio types that a connected vehicle might use while in a particular geographic region. Each radio type is assigned a probability reflecting whether it should be selected, but our invention is designed so that connected vehicles will sometimes select a radio type having less than the highest probability in order to reduce channel congestion on the radio type having the highest probability. The network optimizer tracks the geographic location of different connected vehicles and transmits a set of candidate radio configurations to the connected vehicles which corresponds to their current geographic location; this is repeated each time the vehicle enters a new geographic region. The configuration selector includes code and routines that are operable, when executed by the onboard unit, to cause the onboard unit to use the set of candidate radio configurations to select which radio types to use for different vehicle functions (e.g., such as those provided by one or more vehicle applications of the connected vehicle). The configuration selector also includes code and routines that are operable, when executed by the onboard unit, to aggregate and transmit digital data to the network optimizer a wireless network, and thereby assist the network optimizer to build the database.

There are three example advantages and improvements provided by the embodiments described herein which are not present in the existing solutions. First, the existing solutions do not consider external channel load and resource demand when determining optimum radio types. By comparison, the embodiments described herein consider both external channel load and resource demand. Second, the existing solutions define an optimum radio type and then require all connected vehicles to use this optimum radio type, which results in channel congestion and poor performance by the radio type designated as optimum. By comparison, the embodiments described herein provide connected vehicles with two or more radio types and the connected vehicles are free choose the radio type they want. This approach avoids the problem of channel congestion present in the existing solutions. Third, the existing solutions do not consider the need or benefit of globally configuring which radio types are used within each geographic region with the goal of maximizing the residual channel load experienced for each radio type in all the geographic regions. By comparison, a goal of the embodiments described herein is to maximize the residual channel load experienced for each radio type in all the geographic regions.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: receiving, by a connected vehicle, configuration data describing a set of candidate V2X channels of a V2X radio of the connected vehicle and configuration selection probability values describing a likelihood that particular candidate V2X channels of the set will be selected; selecting a V2X channel from the set that does not have the highest likelihood of being selected; and configuring the V2X radio of the connected vehicle to transmit data packets using the selected V2X channel. Other embodiments of this aspect include corresponding computer systems, apparatus, and computer programs recorded on one or more computer storage devices, each configured to perform the actions of the methods.

Implementations may include one or more of the following features. The method where configuration selection probabilities are operable to maximize a residual channel load experienced in a plurality of geographic regions for all the V2X channels supported by the V2X radio. The method where the configuration selection probabilities are determined based in part on an amount of traffic generated by non-vehicle wireless devices within a geographic region that includes the connected vehicle. The method where the configuration selection probabilities are determined based in part on an amount of network traffic generated by controllable vehicles within a geographic region that includes the connected vehicle. The method where the connected vehicle is a controllable vehicle because the connected vehicle includes an onboard unit having a configuration selector that is operable to execute the method when executed by the onboard unit. The method where the connected vehicle is an automated vehicle. The method may also include the method where the connected vehicle is a highly automated vehicle that operates itself without human intervention. The method where the selected V2X channel is selected from a group that includes one of the following: a WiFi channel; a 3G channel; a 4G channel; an LTE channel; a mmWave communication channel; a DSRC channel; and an LTE-V2X channel. The method where the selected V2X channel is selected from a group that does not include one of the following: a WiFi channel; a 3G channel; a 4G channel; an LTE channel; a mmWave communication channel; a DSRC channel; and an LTE-V2X channel. Implementations of the described techniques may include hardware, a method or process, or computer software on a computer-accessible medium.

One general aspect includes a system including: a processor communicatively coupled to a non-transitory memory that stores computer code that is operable, when executed by the processor, to cause the processor to: receive configuration data describing a set of candidate V2X channels of a V2X radio of a connected vehicle and configuration selection probability values describing a likelihood that particular candidate V2X channels of the set will be selected; selecting a V2X channel from the set that does not have the highest likelihood of being selected; and configuring the V2X radio of the connected vehicle to transmit data packets using the selected V2X channel. Other embodiments of this aspect include corresponding computer systems, apparatus, and computer programs recorded on one or more computer storage devices, each configured to perform the actions of the methods.

Implementations may include one or more of the following features. The system where configuration selection probabilities are operable to maximize a residual channel load experienced in a plurality of geographic regions for all the V2X channels supported by the V2X radio. The system where the configuration selection probabilities are determined based in part on an amount of traffic generated by non-vehicle wireless devices within a geographic region that includes the connected vehicle. The system where the configuration selection probabilities are determined based in part on an amount of network traffic generated by controllable vehicles within a geographic region that includes the connected vehicle. The system where the connected vehicle is a controllable vehicle because the connected vehicle includes a configuration selector that is described by the computer code. The system where the connected vehicle is an automated vehicle. The system may also include the system where the connected vehicle is a highly automated vehicle that operates itself without human intervention. Implementations of the described techniques may include hardware, a method or process, or computer software on a computer-accessible medium.

One general aspect includes a computer program product including instructions that, when executed by one or more processors, cause the one or more processors to perform operations including: receiving configuration data describing a set of candidate V2X channels of a V2X radio of a connected vehicle and configuration selection probability values describing a likelihood that particular candidate V2X channels of the set will be selected; selecting a V2X channel from the set that does not have the highest likelihood of being selected; and configuring the V2X radio of the connected vehicle to transmit data packets using the selected V2X channel. Other embodiments of this aspect include corresponding computer systems, apparatus, and computer programs recorded on one or more computer storage devices, each configured to perform the actions of the methods.

Implementations may include one or more of the following features. The computer program product where configuration selection probabilities are operable to maximize a residual channel load experienced in a plurality of geographic regions for all the V2X channels supported by the V2X radio. The computer program product where the configuration selection probabilities are determined based in part on an amount of traffic generated by non-vehicle wireless devices within a geographic region that includes the connected vehicle. The computer program product where the configuration selection probabilities are determined based in part on an amount of network traffic generated by controllable vehicles within a geographic region that includes the connected vehicle. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 6-10 depict block diagrams for an example analysis by the network optimizer according to some embodiments.

FIGS. 11 and 12 are block diagrams illustrating an example of Basic Safety Message (BSM) data according to some embodiments.

DETAILED DESCRIPTION

Figure 1A:
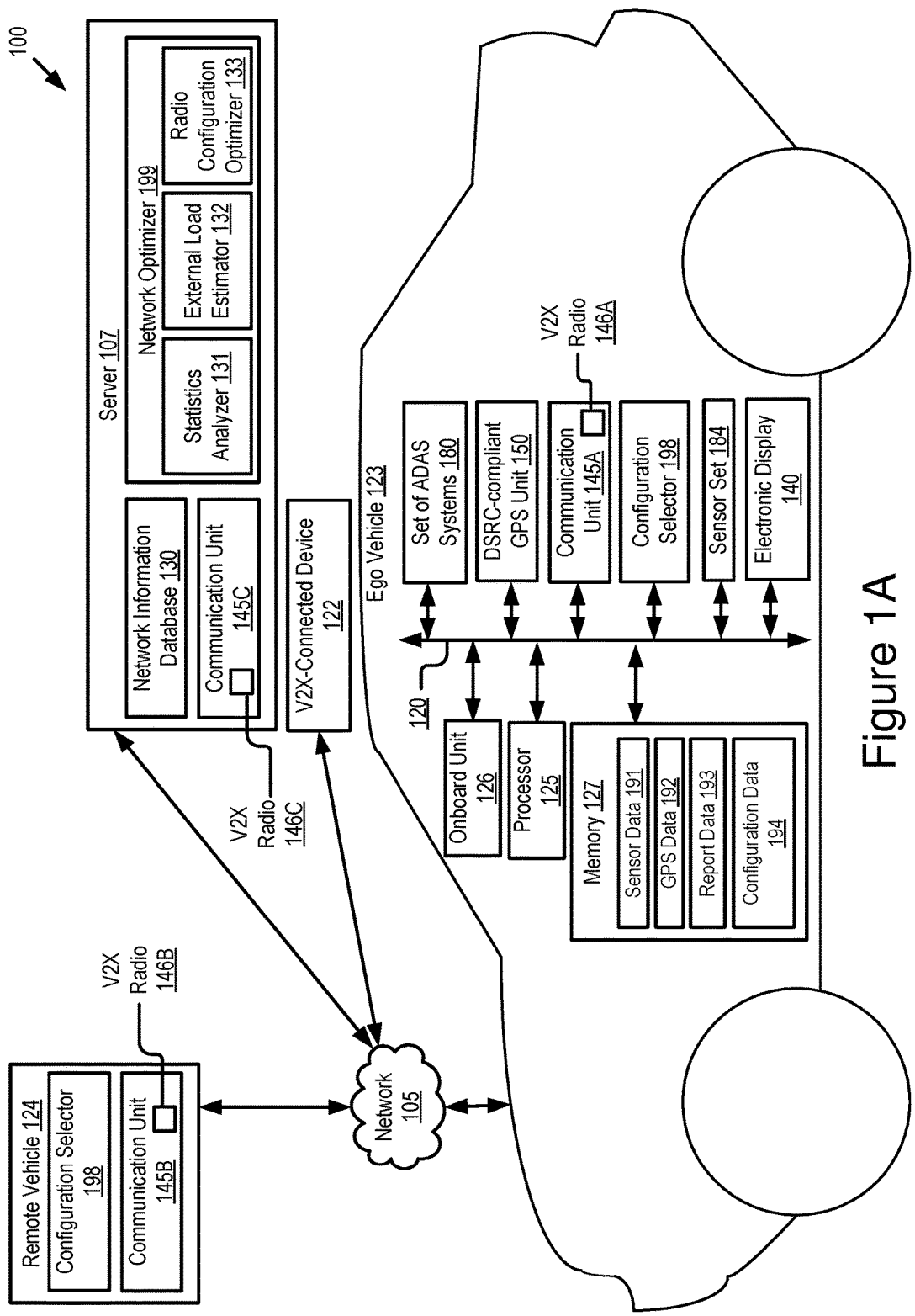
FIG. 1A is a block diagram illustrating an operating environment for a network optimizer according to some embodiments.

Embodiments of a network optimizer are described. Examples of V2X communication that are compatible with the network optimizer include one or more of the following types of wireless V2X communication: DSRC; LTE; mmWave; 3G; 4G; 5G; LTE-Vehicle-to-Anything (LTE-V2X); LTE-Vehicle-to-Vehicle (LTE-V2V); LTE-Device-to- Device (LTE-D2D); 5G-V2X; Intelligent Transportation System-G5 (ITS-G5); ITS-Connect; Voice over LTE (VoLTE); and any derivative or fork of one or more of the V2X communication protocols listed here.

Described herein are embodiments that provide a centralized cloud-based solution that assists connected vehicles to select which radio type to use based on their situation while correcting the deficiencies present in the existing solutions. An additional purpose of the embodiments described herein is to provide a system which globally coordinates which radio types vehicles use in different situations so that all the radio types available in each of the geographic regions perform optimally and have maximum residual bandwidth at any given time.

Many onboard vehicle applications require consistent and high-quality access to digital data received via one or more of the connected vehicle's radio channels in order to provide their functionality. For example, an Advanced Driving Assistance System (ADAS system) of the connected vehicle may make a fatal operating decision for the connected vehicle because the ADAS system does not have consistent access to digital data which should be received from one of the connected vehicle's radio channels.

Image recognition is frequently inaccurate. This is potentially a fatal problem when image recognition is used for vehicular applications. For example, if image recognition is used to determine the content of a roadway sign, then an ADAS system of a vehicle may make a fatal operating decision for the vehicle based on the inaccurate image recognition result.

Connected vehicles have access to many different V2X radio types (e.g., DSRC, LTE, WiFi, mmWave, etc.). Each radio type performs differently in different situations. There are existing solutions which seek to help connected vehicles select an optimal radio type to use, but these existing solutions have major deficiencies. For example, these existing solutions fail to consider the following information when attempting to help connected vehicles to select an optimal radio type to use: (1) eternal channel load, which is defined as an amount of traffic generated by non-vehicle wireless devices; and (2) resource demand, which is defined as an amount of network traffic generated by controllable vehicles.

Failure to consider external channel load and resource demand is a significant deficiency in the existing solutions. For example, frequently the radio type which is designated as being optimum is actually not optimum because the significant effects of external channel load and resource demand are not considered by the existing solutions.

Described herein are embodiments of a network optimizer that provide a centralized cloud-based solution that assists connected vehicles to select which radio type to use (or which type of radio channel to use) based on their situation. The embodiments of the network optimizer described herein overcome the deficiencies of the existing solutions by considering both external channel load and resource demand when providing digital data to connected vehicles that assists them to select which V2X radio (or V2X channel) to use for a given circumstance. In some embodiments, the network optimizer is operable to provide a system which globally coordinates which radio types connected vehicles use in different situations so that all the radio types available in each of the geographic regions perform optimally and have maximum residual bandwidth at any given time.

In some embodiments, the network optimizer includes code and routines installed in a non-transitory memory of a server which is configured to be accessed and executed by a processor of the server. The server includes network communication capabilities. The network optimizer is operable to cause the server to communicate with a wireless network. The network optimizer wirelessly communicates with a configuration client of a connected vehicle. The configuration client includes code and routines installed in an onboard unit of the connected vehicle. The connected vehicle includes network communication capabilities. The configuration selector is operable to cause the connected vehicle to communicate with the wireless network. The configuration selector cooperates with the network optimizer to help the network optimizer provide its functionality. For example, the configuration selector includes code and routines that are operable, when executed by the onboard unit of the connected vehicle, to cause the onboard unit to aggregate report data and transmit the report data to the network optimizer via the wireless network.

In some embodiments, the report data is digital data that describes the following information: (1) a unique identifier of the connected vehicle [e.g., a vehicle identification number (VIN number)]; (2) the geographic location of the connected vehicle; (3) the number of vehicles detected at the geographic location at different times [e.g., as detected via DSRC, BSM probes, camera images, radar, LIDAR, network traffic sniffer, etc.]; (4) the average transmission rate observed for each V2X radio type [e.g., DSRC, LTE, WiFi, mmWave, etc.] at different times [e.g., as observed by a network traffic sniffer or some other sensor of the connected vehicle]; (5) the average overall channel load for each radio type at different times; (6) packet error rates for each radio type at different times; (7) channel busy ratios for different radio types at different times; (8) wireless communication traffic observed from smartphones [e.g., such as those carried by a user of the connected vehicle] and other non-vehicular endpoints; (9) wireless communication traffic observed from vehicular endpoints [e.g., as observed by a network traffic sniffer or some other sensor of the connected vehicle]; and (10) the radio configurations (e.g., V2X radio channels) being used by the connected vehicle.

In some embodiments, the network optimizer receives the report data from many different connected vehicles (each having their own instance of the configuration selector). The network optimizer uses the report data to build a network information database (or some other data structure) that describes the following data for different geographic regions: (1) the expected number of vehicles at different times; (2) the average transmission rate for each V2X radio type [e.g., DSRC, LTE, WiFi, mmWave, etc.] at different times; (3) the average overall channel load for each radio type at different times; and (4) other network data such as packet error rate, channel busy ratio, traffic sources, etc. See, e.g., FIG. 7 and descriptions about the functionality of the statistics analyzer of the network optimizer provided herein.

In some embodiments, a geographic area (e.g., the state of California) is divided into a plurality of geographic regions (e.g., county-by-county, blocks having the same area similar to a grid system, or some other basis for forming the geographic regions). The network information database is indexed based on the geographic regions such that the data stored in the network information database is retrievable on a geographic region-to-geographic region basis. Each time the network optimizer receives a new instance of report data, the network optimizer parses out the geographic location (e.g., GPS coordinate) included in it and determines which geographic region includes this geographic location. The network optimizer then associates the information included in the report data with this particular geographic region.

In some embodiments, the network optimizer analyzes this data and determines, for each of the geographic regions, the following information: (1) the amount of traffic generated by non-vehicle wireless devices [i.e., "external channel load"]; and (2) the amount of network traffic generated by controllable vehicles [i.e., "resource demand"].

In some embodiments, the network optimizer analyzes the external channel load, the resource demand and the other data included in the network information database for each geographic region to generate a set of candidate radio configurations for each geographic region. The set of candidate radio configurations describes two or more networks types that the connected vehicle should use based on its geographic region. Each geographic region has its own set of radio configurations.

In some embodiments, each of the network types included in the set of candidate radio configurations is assigned a configuration selection probability. A configuration network probability is a number or value that describes a likelihood that a particular radio type is the network type that the connected vehicle should select based on its geographic location. In some embodiments, an example advantage and improvement of the embodiments described herein is that the connected vehicle is free to select a network type having a lower probability since otherwise channel congestion would occur if every vehicle always selected the network type having the highest probability. Another example advantage and improvement of the embodiments described herein is that the network optimizer assigns the configuration network probabilities with the goal of maximizing the residual channel load for each available radio type in the geographic region.

In some embodiments, the network optimizer tracks the geographic location of different connected vehicles based on the report data it receives for the different connected vehicles. For each instance of report data, the network optimizer uses the VIN number included in the report data (this is an optional feature of the network optimizer) to retrieve the geographic information included in a last instance of report data that this particular connected vehicle provided to the network optimizer. By comparing the current geographic information to the prior geographic information, the network optimizer is able to determine if this particular connected vehicle has entered a new geographic region. If a particular connected vehicle has entered a new geographic region (relative to the last new geographic region it entered), then the network optimizer transmits a set of candidate radio configurations to the connected vehicle which corresponds to their new geographic region.

In some embodiments, the configuration selector of the connected vehicle receives the set of candidate radio configurations. The configuration selector is configured to use the set of candidate radio configurations to select which radio types to use for different vehicle functions. An example advantage and improvement of the embodiments described herein is that the configuration selector is configured so that it does not always select the candidate radio configuration having the highest configuration selection probability.

In some embodiments, the configuration selector is an element of an autonomous vehicle. In some embodiments, the configuration selector is an element of a non-autonomous vehicle.

In some embodiments, the connected vehicles that includes the configuration selector are DSRC-equipped vehicles. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages. A DSRC-compliant GPS unit is operable to provide positional information for a vehicle (or some other DSRC-equipped device that includes the DSRC-compliant GPS unit) that has lane-level accuracy. The DSRC-compliant GPS unit is described in more detail below A "DSRC-equipped" device is a processor-based device that includes a DSRC radio, a DSRC-compliant GPS unit and is operable to lawfully send and receive DSRC messages in a jurisdiction where the DSRC-equipped device is located. Various endpoints may be DSRC-equipped devices, including, for example, a roadside unit (RSU), a smartphone, a tablet computer and any other processor-based computing device that includes a DSRC radio and is operable to lawfully send and receive DSRC messages as described above.

In some embodiments, an RSU that is a DSRC-equipped device does not include a DSRC-compliant GPS unit, but does include a non-transitory memory that stores digital data describing positional information for the RSU having lane-level accuracy, and the DSRC radio or some other system of the RSU inserts a copy of this digital data in the BSM data that is transmitted by the DSRC radio of the RSU. In this way, the RSU does not include a DSRC-compliant GPS unit but is still operable to distribute BSM data that satisfies the requirements for the DSRC standard. The BSM data is described in more detail below with reference to FIGS. 11 and 12 according to some embodiments.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States, Europe and Asia, DSRC messages are transmitted at 5.9 GHz. In the United States, DSRC messages are allocated 75 MHz of spectrum in the 5.9 GHz band. In Europe and Asia, DSRC messages are allocated 30 MHz of spectrum in the 5.9 GHz band. A wireless message, therefore, is not a DSRC message unless it operates in the 5.9 GHz band. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

The wireless messages of key fobs made as a component of a remote keyless entry system are not DSRC messages for additional reasons. For example, the payload for a DSRC message is also required to include digital data describing a rich amount of vehicular data of various types of data. In general, a DSRC message always includes, at a minimum, a unique identifier of the vehicle which transmits the DSRC message as well as the GPS data for that vehicle. This amount of data requires a larger bandwidth than what is possible for other types of non-DSRC wireless messages. The wireless messages of key fobs as a component of a remote keyless entry system are not DSRC messages because they do not include a payload which is permissible under the DSRC standard. For example, a key fob merely transmits a wireless message including a digital key which is known to a vehicle which is paired with the key fob; there is not sufficient bandwidth for other data to be included in the payload because the bandwidth allocated for these transmissions is very small. By comparison, DSRC messages are allocated large amounts of bandwidth and are required to include a far richer amount of data, including, for example, a unique identifier and the GPS data for the vehicle which transmitted the DSRC message.

In some embodiments, a DSRC-equipped vehicle does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data (e.g., the GPS data 192) that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway.

In some embodiments, a DSRC-compliant GPS unit is operable to identify, monitor and track its two-dimensional position within 1.5 meters of its actual position 68% of the time under an open sky.

Referring to FIG. 1A, depicted is an operating environment 100 for a network optimizer 199 according to some embodiments. As depicted, the operating environment 100 includes the following elements: an ego vehicle 123; a remote vehicle 124; an V2X-connected device 122; and a server 107. These elements are communicatively coupled to one another by a network 105.

Although one ego vehicle 123, one remote vehicle 124, one V2X-connected device 122, one server 107 and one network 105 are depicted in FIG. 1A, in practice the operating environment 100 may include one or more ego vehicles 123, one or more remote vehicles 124, one or more V2X-connected devices 122, one or more servers 107, and one or more networks 105.

Both the ego vehicle 123 and the remote vehicle 124 are connected vehicles. For example, each of the ego vehicle 123 and the remote vehicle 124 include a communication unit 145A, 145B (referred to collectively or individually, along with the communication 145C of the server 107, as a "communication unit 145") and are therefore each are a connected vehicle that is operable to send and receive electronic messages via the network 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, LTE, LTE-V2V, LTE-V2I, LTE-V2X, LTE-D2D, 5G-V2X, ITS-G5, ITS-Connect, VoLTE or any other mobile data network or combination of mobile data networks. Further, the network 105 may include one or more IEEE 802.11 wireless networks.

The following are endpoints of the network 105: the ego vehicle 123; the remote vehicle 124; the V2X-connected device 122; and the server 107. In some embodiments, the ego vehicle 123 and the remote vehicle 124 include an instance of the configuration selector 198. The ego vehicle 123 and the remote vehicle 124 may be referred to collectively or individually as a "vehicular endpoint" or the "vehicular endpoints." The configuration selectors of the vehicular endpoints relay report data 193 to the server 107 via the network 105. In some embodiments, a V2X-connected device 122 may relay an instance of report data 193 to the server 107 via the network 105 (e.g., if a particular vehicular endpoint is outside of transmission range of the server 107). The server 107 includes an instance of the network optimizer 199. The network optimizer 199 analyzes the report data 193 from the vehicular endpoints and determines, based on this analysis, a set of candidate radio configurations to provide to the vehicular endpoints of the operating environment based on the geographic location of each of these vehicular endpoints (as indicated by their most recently report instance of report data 193). The network optimizer 199 then provisions, for each particular vehicular endpoint and based on its particular geographic location, an instance of configuration data 194 describing the set of candidate radio configurations for this particular vehicular endpoint. This provisioning process is repeated by the network optimizer 199 for each vehicular endpoint. The configuration selectors 198 of the vehicular endpoints then configure their own communication unit 145 based on the configuration data 194 received from the network optimizer 199.

The ego vehicle 123 is any type of connected vehicle. For example, the ego vehicle 123 is one of the following types of vehicles that includes a communication unit 145A: a car;

a truck; a sports utility vehicle; a bus; a semi-truck; a robotic car; a drone or any other roadway-based conveyance. In some embodiments, the ego vehicle 123 is a DSRC-equipped vehicle.

In some embodiments, the ego vehicle 123 is an autonomous vehicle or a semi-autonomous vehicle. For example, the ego vehicle 123 includes a set of Advanced Driver Assistance Systems 180 (a set of ADAS systems 180) which provide autonomous features to the ego vehicle 123 which are sufficient to render the ego vehicle 123 an autonomous vehicle. The set of ADAS systems 180 includes one or more ADAS systems.

The National Highway Traffic Safety Administration ("NHTSA") has defined different "levels" of autonomous vehicles, e.g., Level 0, Level 1, Level 2, Level 3, Level 4 and Level 5. If an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower level number. The different levels of autonomous vehicles are described briefly below.

Level 0: The set of ADAS systems 180 installed in a vehicle have no vehicle control. The set of ADAS systems 180 may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems 180 installed in the autonomous vehicle may provide autonomous features such as one or more of the following: Adaptive Cruise Control (ACC); and Parking Assistance with automated steering and Lane Keeping Assistance (LKA) Type II, in any combination.

Level 2: The driver is obliged to detect objects and events in the roadway environment and respond if the set of ADAS systems 180 installed in the autonomous vehicle fail to respond properly (based on the driver's subjective judgement). The set of ADAS systems 180 installed in the autonomous vehicle executes accelerating, braking, and steering. The set of ADAS systems 180 installed in the autonomous vehicle can deactivate immediately upon take-over by the driver.

Level 3: Within known, limited environments (such as freeways), the driver can safely turn their attention away from driving tasks but must still be prepared to take control of the autonomous vehicle when needed.

Level 4: The set of ADAS systems 180 installed in the autonomous vehicle can control the autonomous vehicle in all but a few environments such as severe weather. The driver must enable the automated system (which is comprised of the set of ADAS systems 180 installed in the vehicle) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle (HAV) is an autonomous vehicle that is Level 3 or higher.

Accordingly, in some embodiments the ego vehicle 123 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The set of ADAS systems 180 includes one or more of the following ADAS systems: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system (also referred to as a LKA system); a pedestrian protection system; a traffic sign recognition system; a turning assistant; a wrong-way driving warning system; autopilot; sign recognition; and sign assist. Each of these example ADAS systems provide their own features and functionality that may be referred to herein as an "ADAS feature" or an "ADAS functionality," respectively. The features and functionality provided by these example ADAS systems are also referred to herein as an "autonomous feature" or an "autonomous functionality," respectively.

In some embodiments, the ego vehicle 123 includes the following elements: the set of ADAS systems 180; an onboard unit 126; a processor 125; a memory 127; a communication unit 145; a DSRC-compliant GPS unit 150; a sensor set 184; an electronic display 140; and a configuration selector 198. These elements of the ego vehicle 123 are communicatively coupled to one another via a bus 120.

The set of ADAS systems 180 was described above, and so, that description will not be repeated here.

In some embodiments, the processor 125 and the memory 127 may be elements of an onboard vehicle computer system. The onboard vehicle computer system may be operable to cause or control the operation of the configuration selector 198 of the ego vehicle 123. The onboard vehicle computer system may be operable to access and execute the data stored on the memory 127 to provide the functionality described herein for the configuration selector 198 of the ego vehicle 123 or its elements. The onboard vehicle computer system may be operable to execute the configuration selector 198 which causes the onboard vehicle computer system to execute one or more steps of one or more of the methods 300, 400 described below with reference to FIGS. 3A and 3B and FIG. 4, respectively.

In some embodiments, the processor 125 and the memory 127 may be elements of the onboard unit 126. The onboard unit 126 includes an electronic control unit (herein "ECU") or an onboard vehicle computer system that may be operable to cause or control the operation of the configuration selector 198. In some embodiments, the onboard unit 126 is operable to access and execute the data stored on the memory 127 to provide the functionality described herein for the configuration selector 198 or its elements. The onboard unit 126 may be operable to execute the configuration selector 198 which causes the onboard unit 126 to execute one or more steps of one or more of the methods 300, 400 described below with reference to FIGS. 3A, 3B and 4.

In some embodiments, the DSRC-compliant GPS unit 150 includes any hardware and software necessary to make the ego vehicle 123 or the DSRC-compliant GPS unit 150 compliant with one or more of the following DSRC standards, including any derivative or fork thereof: EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906: 2004 Electronic Fee Collection—Application interface.

In some embodiments, the DSRC-compliant GPS unit 150 is operable to provide GPS data 192 describing the location of the ego vehicle 123 with lane-level accuracy. For example, the ego vehicle 123 is traveling in a lane of a roadway. Lane-level accuracy means that the location of the ego vehicle 123 is described by the GPS data 192 so accurately that the ego vehicle's 123 lane of travel within the roadway may be accurately determined based on the GPS data 192 for this ego vehicle 123 as provided by the DSRC-compliant GPS unit 150. In some embodiments, the GPS data 192 is an element of the BSM data that is transmitted by the communication unit 145A as an element of a BSM.

In some embodiments, the DSRC-compliant GPS unit 150 includes hardware that wirelessly communicates with a GPS satellite to retrieve GPS data 192 that describes the geographic location of the ego vehicle 123 with a precision that is compliant with the DSRC standard. The DSRC standard requires that GPS data 192 be precise enough to infer if two vehicles (one of which is, for example, the ego vehicle 123) are located in adjacent lanes of travel. In some embodiments, the DSRC-compliant GPS unit 150 is operable to identify, monitor and track its two-dimensional position within 1.5 meters of its actual position 68% of the time under an open sky. Since driving lanes are typically no less than 3 meters wide, whenever the two-dimensional error of the GPS data 192 is less than 1.5 meters the network optimizer 199 described herein may analyze the GPS data 192 provided by the DSRC-compliant GPS unit 150 and determine what lane the ego vehicle 123 is traveling in based on the relative positions of two or more different vehicles (one of which is, for example, the ego vehicle 123) traveling on the roadway at the same time.

By comparison to the DSRC-compliant GPS unit 150, a conventional GPS unit which is not compliant with the DSRC standard is unable to determine the location of an ego vehicle 123 with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to identify a lane of travel for an ego vehicle 123 based on GPS data 192 alone; instead, systems having only conventional GPS units must utilize sensors such as cameras to identify the ego vehicle's 123 lane of travel. Identifying a lane of travel of a vehicle is beneficial, for example, because in some embodiments the GPS data 192 is included in the report data 193 provided to the network optimizer 199, and so, having more accurate GPS data 192 beneficially helps the network optimizer 199 to generate more optimized candidate radio configurations for the ego vehicle 123.

In some embodiments, the ego vehicle 123 may include a sensor set 184. The sensor set 184 includes one or more sensors that are operable to measure the physical environment outside of the ego vehicle 123. For example, the sensor set 184 may include one or more sensors that record one or more physical characteristics of the physical environment that is proximate to the ego vehicle 123. The memory 127 may store sensor data 191 that describes the one or more physical characteristics recorded by the sensor set 184. The sensor data 191 may be included in the report data 193. The sensor data 191 is stored in the memory 127. In some embodiments, the DSRC-compliant GPS unit 150 is an element of the sensor set 184.

In some embodiments, the sensor set 184 of the ego vehicle 123 may include one or more of the following vehicle sensors: a clock; a network traffic sniffer; a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

In some embodiments, the sensor set 184 includes any sensors are necessary to build the report data 193.

The communication unit 145 transmits and receives data to and from a network 105 or to another communication channel. In some embodiments, the communication unit 145 may include a DSRC transceiver, a DSRC receiver and other hardware or software necessary to make the ego vehicle 123 is a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio 146A. The V2X radio 146A is a hardware unit that includes a transmitter and a receiver that is operable to send and receive wireless messages via any V2X protocol. For example, the V2X radio 146A includes any hardware and software that is necessary to send and receive one or more of the following types of V2X message: DSRC; LTE; millimeter wave communication; 3G; 4G; 5G; LTE-V2X; LTE-V2V; LTE-D2D; 5G-V2X; ITS-G5; ITS-Connect; VoLTE; and any derivative or fork of one or more of the V2X communication protocols listed here.

In some embodiments, the V2X radio 146A is a multi-channel V2X radio that includes a plurality of channels. In some embodiments, some of the channels are operable to send and receive V2X messages via a first V2X protocol whereas some of the channels are operable to send and receive V2X messages via an Nth V2X protocol.

In some embodiments, the V2X radio 146A is a DSRC radio. For example, the V2X radio 146A is operable to send and receive wireless messages via DSRC. The V2X transmitter is operable to transmit and broadcast DSRC messages over the 5.9 GHz band. The V2X receiver is operable to receive DSRC messages over the 5.9 GHz band. The V2X radio includes seven channels (e.g., DSRC channel numbers 172, 174, 176, 178, 180, 182 and 184) with at least one of these channels reserved for sending and receiving BSMs (e.g., DSRC channel number 172 is reserved for BSMs). In some embodiments, at least one of these channels is reserved for sending and receiving Pedestrian Safety Messages ("PSM" if singular, or "PSMs" if plural) as described in U.S. patent application Ser. No. 15/796,296 filed on Oct. 27, 2017 and entitled "PSM Message-based Device Discovery for a Vehicular Mesh Network," the entirety of which is hereby incorporated by reference. In some embodiments, DSRC channel number 172 is reserved for sending and receiving PSMs.

In some embodiments, the V2X radio 146A includes a non-transitory memory which stores digital data that controls the frequency for broadcasting BSM messages. In some embodiments, the non-transitory memory stores a buffered version of the GPS data 192 for the ego vehicle 123 so that the GPS data 192 for the ego vehicle 123 is broadcast as an element of the BSMs which are regularly broadcast by the V2X radio 146A. BSMs may be broadcast by the V2X radio 146A over various V2X protocols, and not just DSRC.

In some embodiments, the V2X radio 146A includes any hardware or software which is necessary to make the ego vehicle 123 compliant with the DSRC standards. In some embodiments, the DSRC-compliant GPS unit 150 is an element of the V2X radio 146A.

The electronic display 140 includes any type of electronic display device including, for example, one or more of the following: a dash meter display of the ego vehicle 123; a heads-up display unit (HUD) of the ego vehicle 123; an augmented reality (AR) display or viewing device of the ego vehicle 123; and a head unit of the ego vehicle 123. An example of a suitable HUD and AR viewing device is described in U.S. patent application Ser. No. 15/603,086 filed on May 23, 2017 and entitled "Providing Traffic Mirror Content to a Driver," the entirety of which is hereby incorporated by reference. Another example of a suitable HUD and AR viewing device is described in U.S. patent application Ser. No. 15/591,100 filed on May 9, 2017 and entitled "Augmented Reality for Vehicle Lane Guidance," the entirety of which is hereby incorporated by reference.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The ego vehicle 123 may include one or more processors 125. Other processors, operating systems, sensors, displays, and physical configurations may be possible.

The memory 127 is a non-transitory memory that stores instructions or data that may be accessed and executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM). The ego vehicle 123 may include one or more memories 127.

Figure 1B:
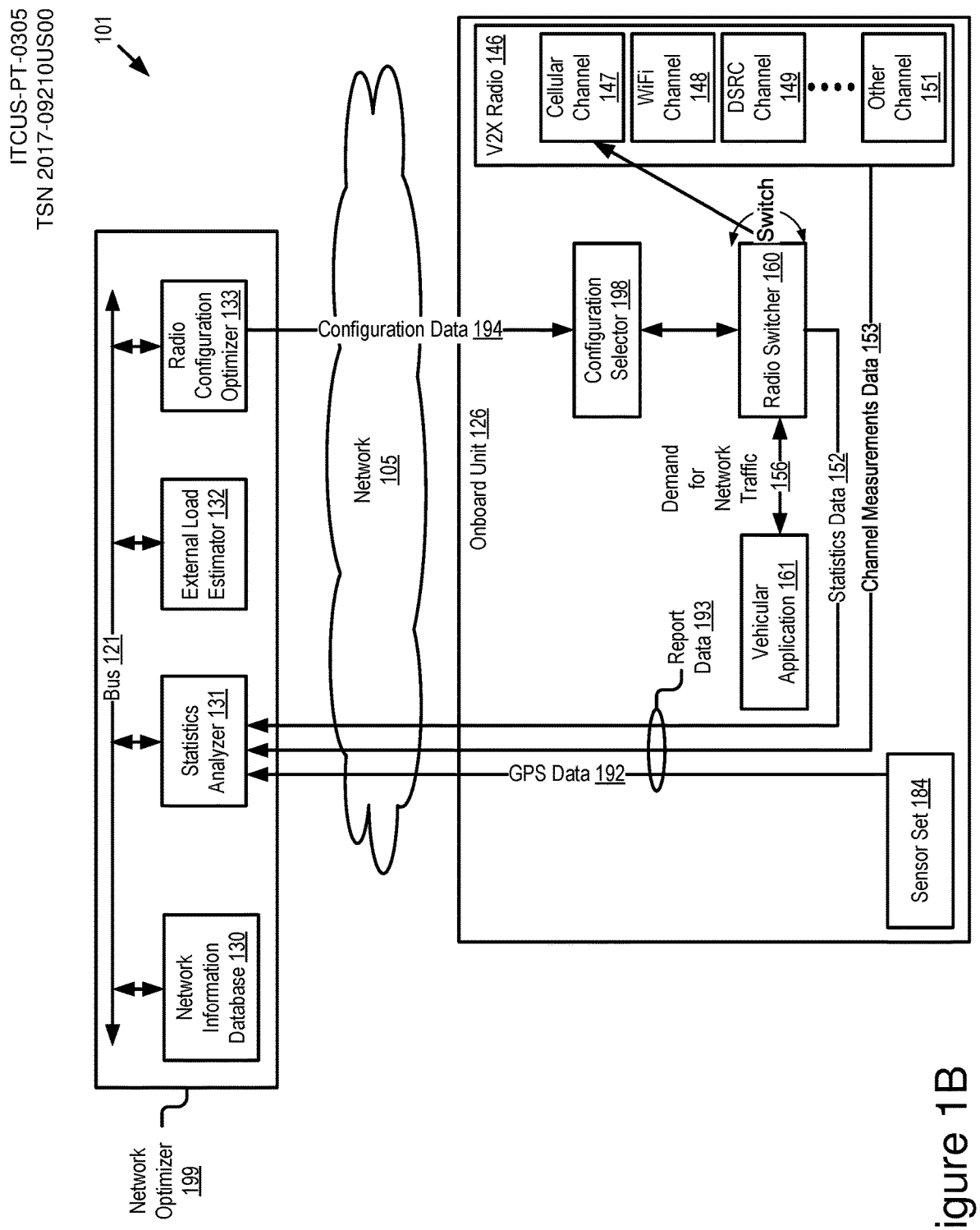
FIG. 1B is a block diagram illustrating an operating environment for a network optimizer according to some embodiments.

The memory 127 of the ego vehicle 123 stores one or more of the following types of digital data: the sensor data 191; the GPS data 192; report data 193; and configuration data 194. In some embodiments, the configuration data 194 is generated and received, via the network 105, from the network optimizer 199. In some embodiments, the sensor data 191 and the GPS data 192 are elements of the report data 193. FIG. 1B depicts statistics data 152 and channel measurements data 153. In some embodiments, the statistics data 152 and the channel measurements data 153 are stored on the memory 127 depicted in FIG. 1A. For example, the configuration selector 198 includes code and routines that are operable, when executed by the onboard unit 126, to cause the onboard unit 126 to: analyze the sensor data 191 and the GPS data 192; and generate the statistics data 152 and the channel measurements data 153 based on this analysis. In some embodiments, the report data 193 includes one or more of the following types of digital data: the sensor data 191; the GPS data 192; the statistics data 152; and the channel measurements data 153.

Referring back to FIG. 1A, although not depicted in FIG. 1A, in some embodiments the memory 127 stores one or more V2X messages which are received from the server 107 via the network 105. These V2X messages store the configuration data 194 that is received from the server 107.

In some embodiments the memory 127 stores the BSM data 197 depicted in FIGS. 11 and 12. The BSM data 197 may be received as a payload for a BSM that is received from the V2X-connected device 122, the remote vehicle 124 or the server 107. For example, in some embodiments the configuration data 194 may be included in the BSM data 197 and relayed to the ego vehicle 123 from the network optimizer 199 of the server 107 via one or more intermediary endpoints such as the remote vehicle 124 or the V2X-connected device 122.

In some embodiments, the memory 127 stores DSRC data which is digital data received in a DSRC message or transmitted as a DSRC message. The DSRC data describes any information that is included in the BSM data 197. For example, a BSM message is a special type of DSRC message which is transmitted at a regular interval (e.g., once every 0.10 seconds), but the content or payload of a DSRC message (i.e., the DSRC data) is the same as that of a BSM message (i.e., the DSRC data for a DSRC message is the same as or similar to the BSM data for a BSM message).

In some embodiments, the memory 127 stores, as digital data, any data described herein. In some embodiments, the memory 127 stores any data that is necessary for the network optimizer 199 to provide its functionality.

The sensor data 191 is digital data that describes the recordings and images captured by the sensor set 184. The sensor data 191 includes digital data that describes one or more of the following: (1) the number of vehicles detected at the geographic location at different times [e.g., as detected via DSRC, BSM probes, camera images, radar, LIDAR, network traffic sniffer, etc.]; (2) the average transmission rate observed for each V2X radio type [e.g., DSRC, LTE, WiFi, mmWave, etc.] of the V2X radio 146A at different times [e.g., as observed by a network traffic sniffer or some other sensor of the sensor set 184]; (3) the average overall channel load for each radio type of the V2X radio 146A at different times; (4) packet error rates for each radio type of the V2X radio 146A at different times; (5) channel busy ratios for different radio types of the V2X radio 146A at different times; (6) wireless communication traffic observed from smartphones [e.g., such as those carried by a user of the ego vehicle 123] and other non-vehicular endpoints; and (7) wireless communication traffic observed from vehicular endpoints [e.g., as observed by a network traffic sniffer or some other sensor of the sensor set 184].

The GPS data 192 is digital data that describes the geographic location of the ego vehicle 123. In some embodiments, the GPS data 192 describes the geographic location of the ego vehicle 123 with lane-level accuracy.

The report data 193 is digital data that describes one or more of the following: (1) a unique identifier of the connected vehicle [e.g., a VIN number]; (2) the geographic location of the ego vehicle 123; (3) the number of vehicles detected at the geographic location at different times [e.g., as detected via DSRC, BSM probes, camera images, radar, LIDAR, network traffic sniffer, etc.]; (4) the average transmission rate observed for each V2X radio type [e.g., DSRC, LTE, WiFi, mmWave, etc.] of the V2X radio 146A at different times [e.g., as observed by a network traffic sniffer or some other sensor of the sensor set 184]; (5) the average overall channel load for each radio type of the V2X radio 146A at different times; (6) packet error rates for each radio type of the V2X radio 146A at different times; (7) channel busy ratios for different radio types of the V2X radio 146A at different times; (8) wireless communication traffic observed from smartphones [e.g., such as those carried by a user of the ego vehicle 123] and other non-vehicular endpoints; (9) wireless communication traffic observed from vehicular endpoints [e.g., as observed by a network traffic sniffer or some other sensor of the sensor set 184]; and (10) the radio configurations (e.g., V2X radio channels) being used by the ego vehicle 123.

The V2X radio 146A is a multi-channel V2X radio that includes various types of V2X radio channels, and as such, can transmit and receive various types of V2X communications. For example, FIG. 1B depicts a plurality of V2X radio channels of the V2X radio 146A that may be used for sending and receiving V2X communications. The configuration selector 198 determines which of these V2X radio channels to use for sending and receiving V2X communications based at least in part on the configuration data 194 most recently received from the network optimizer 199 via the network 105. The configuration data 194 includes digital data that describes a set of candidate radio configurations for configuring the V2X radio 146A based on an analysis provided by the network optimizer 199.

For example, the configuration data 194 describes: (1) a plurality of candidate radio channels that can be used by the V2X radio 146A for sending and receiving V2X communications; and (2) for each particular candidate radio channel, a configuration network probability which was determined by the network optimizer 199 based on analyzing one or more instances of report data 193. The configuration selector 198 includes code and routines that are operable, when executed by the onboard unit 126, to cause the onboard unit 126 to retrieve the configuration data 194 from the memory 127 and select one of the plurality of candidate radio channels to use for sending and receiving V2X messages based at least in part on the configuration network probabilities for each of these candidate radio channels.

In some embodiments, a configuration network probability is a number or value that describes a likelihood that a particular radio type (i.e., a particular V2X channel of the V2X radio 146A) is the network type that the configuration selector 198 should select based on its geographic location. Each configuration network probability described by the configuration data 194 is logically associated with (or assigned to) a single candidate radio channel in the organization of the configuration data 194. Accordingly, the configuration data 194 describes: (1) a plurality of candidate radio channels; and (2) a plurality of values for configuration network probabilities, one configuration network probability value for each of the candidate radio channels.

In some embodiments, an example advantage and improvement of the of the configuration selector 198 relative to existing solutions is that the code and routines of the configuration selector 198 are operable so that the configuration selector 198 does not always select the candidate radio channel having the configuration network probability value indicating the highest likelihood since doing so would lead to channel congestion for this candidate radio channel, i.e., the channel congestion would be caused by all the ego vehicles 123 in this particular geographic region selecting the same candidate radio channel during a same time period.

The plurality of candidate radio channels included in an instance of configuration data 194 may be described as "set of candidate radio configurations." The configuration selector 198 selects one candidate radio channels as the configuration for the V2X radio 146A for a period of time, and in so doing, configures the V2X radio 146A based at least in part on the configuration data 194. According, the plurality of candidate radio channels described by the configuration data 194 are a set of candidate radio configurations for the V2X radio 146A of the ego vehicle 123.

In some embodiments, each of the candidate radio channels included in the plurality of candidate radio channels described by the configuration data 194 is a V2X channel and not a non-V2X channel.

In some embodiments, a geographic region includes a plurality of vehicles (e.g., the ego vehicle 123 and the remote vehicle 124) which are controllable by the network optimizer 199, and each vehicle within the geographic region receives the same configuration data 194. However, the configuration selector 198 for each vehicular endpoint is configured so that different configuration selectors 198 within the same geographic region may select a different candidate radio channel as the configuration for their vehicle's V2X radio.

In some embodiments, when assigning the configuration network probability values for each set of candidate radio configurations described by different instances of configuration data 194 for various vehicles (e.g., the ego vehicle 123 and the remote vehicle 124) across one or more geographic regions, each of the sets of candidate radio configurations for each of the geographic regions are collectively optimized relative to one another by the network optimizer 199 so that residual channel load for each available radio type (e.g., V2X channel type) in each geographic region is maximized (or substantially maximized).

Figure 3A:
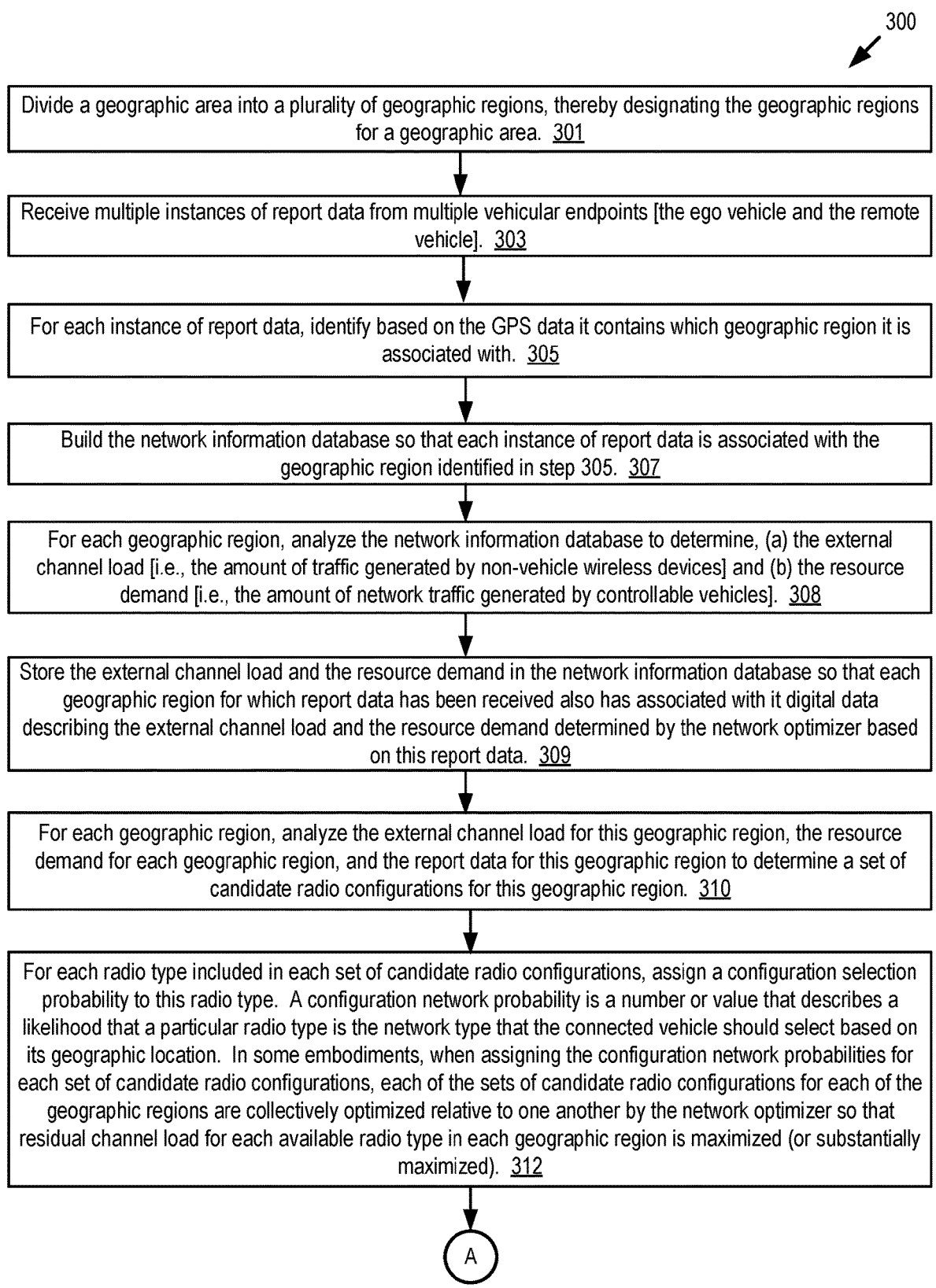
FIGS. 3A and 3B depict a method for configuring a channel selection of a vehicle-to-anything (V2X) radio according to some embodiments.
Figure 3B:
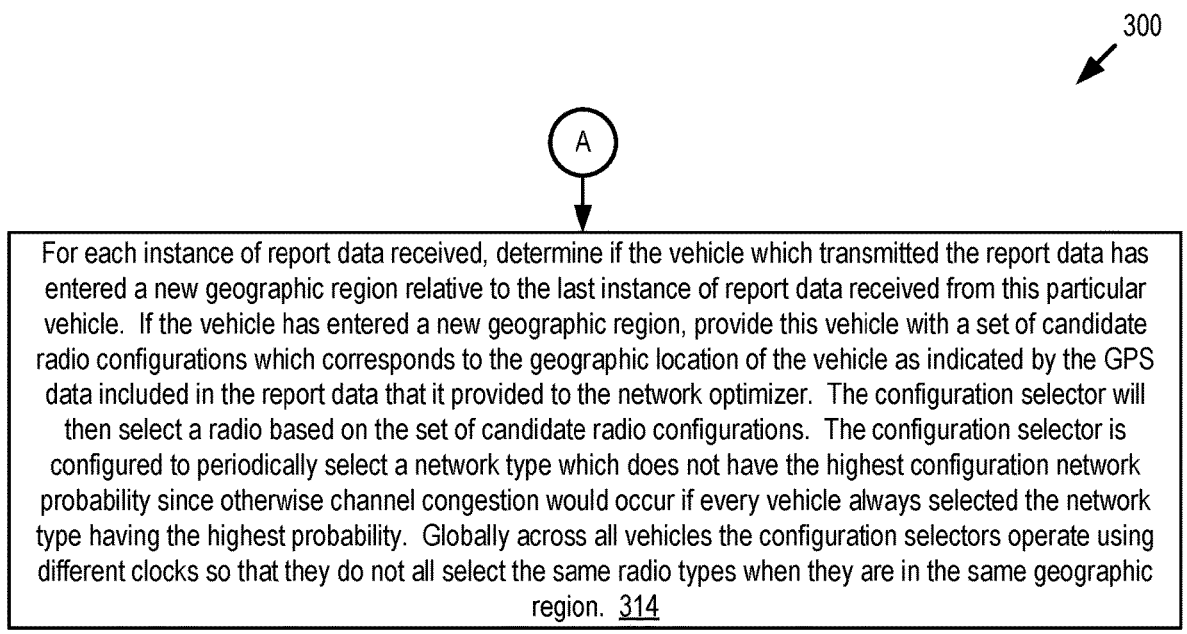
Figure 4:
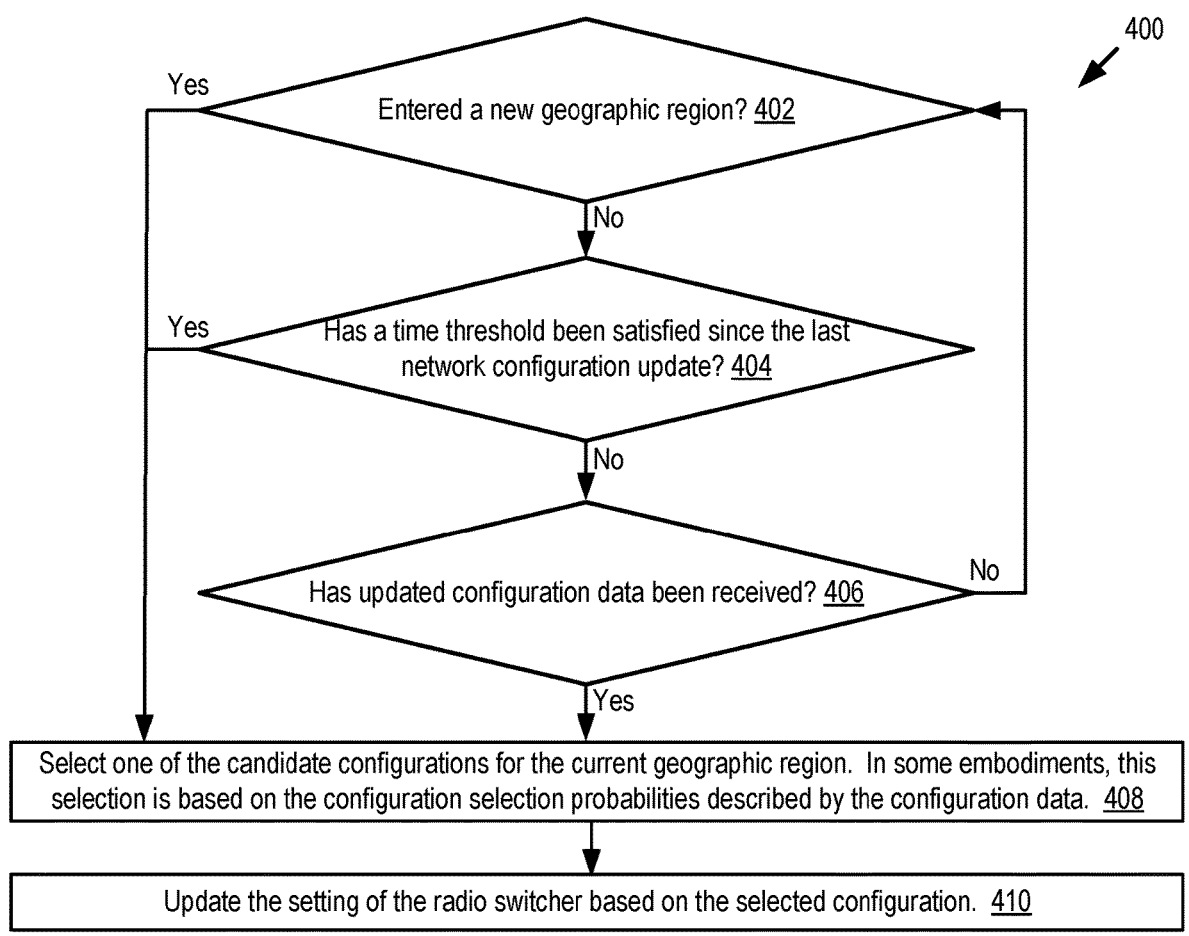
FIG. 4 depicts a method of operation for a configuration selector of a vehicular endpoint according to some embodiments.

In some embodiments, the configuration selector 198 includes software that is operable, when executed by the processor 125, to cause the processor 125 to execute one or more the steps of the methods 300, 400 depicted in FIGS. 3 and 4.

In some embodiments, the configuration selector 198 is implemented using hardware including a field-programmable gate array ("FPGA") or an application-specific integrated circuit ("ASIC"). In some other embodiments, the configuration selector 198 is implemented using a combination of hardware and software.

The remote vehicle 124 includes elements similar to the ego vehicle 123, and so, those descriptions will not be repeated here. For example, the remote vehicle 124 includes one or more of the following elements: a configuration selector 198; and a communication unit 145B including a V2X radio 146B. The configuration selector 198 of the remote vehicle 124 provides the same functionality as the configuration selector 198 of the ego vehicle 123, and so that description will not be repeated here. The communication unit 145B and the V2X radio 146B of the remote vehicle 124 provide the same functionality as the communication unit 145A and the V2X radio 146A of the ego vehicle 123, and so, those descriptions will not be repeated here.

Although not depicted in FIG. 1A, in some embodiments the remote vehicle 124 includes one or more of the elements of the ego vehicle 123. For example, the remote vehicle 124 includes one or more of the following: a sensor set 184; an onboard unit 126; a processor 125; a memory 127; a set of ADAS systems 180; a DSRC-compliant GPS unit 150; and an electronic display 140.

The configuration selector 198 of the remote vehicle 124 provides the same functionality to the remote vehicle 124 as the configuration selector 198 of the ego vehicle 123 provides to the ego vehicle 123. For example, the configuration selector 198 of the remote vehicle 124 generates report data 193, provides the report data 193 to the network optimizer 199 via the network 105 and uses configuration data 194 received from the network optimizer 199 via the network 105 when selecting how to configure the V2X radio 146B of the communication unit 145B (i.e., which V2X channel of the V2X radio 146B to use for sending and receiving V2X messages).

The V2X-connected device 122 includes a smartphone, tablet computer, personal computer, roadside unit or some other processor-based computing device that includes a communication unit such as the communication unit 145A. In some embodiments, the V2X-connected device 122 is a DSRC-equipped device. The V2X-connected device 122 is operable, for example, to receive V2X messages and relay these messages to other connected devices such as the ego vehicle 123, the remote vehicle 124 and the server 107. In this way, the V2X-connected device 122 may relay a V2X message to an endpoint that would otherwise be outside of transmission range of an endpoint that transmitted the V2X message.

The server 107 is a processor-based computing device. For example, the computing device may include a standalone hardware server. In some implementations, the server 107 is communicatively coupled to the network 105. The server 107 includes network communication capabilities. The server 107 is operable to send and receive wireless messages via the network 105.

As depicted, the server 107 includes the following elements: a communication unit 145C including a V2X radio 146C; a network information database 130; and a network optimizer 199.

The communication unit 145C and the V2X radio 146C of the server 107 provide the same or similar functionality as the communication unit 145A and the V2X radio 146A of the ego vehicle 123, and so, those descriptions will not be repeated here.

The network information database 130 and some of the functionality of the network optimizer 199 are now described according to some embodiments by reference to some of the functionality of the configuration selector 198 according to some embodiments.

In some embodiments, the configuration selector 198 includes code and routines that, when executed by the onboard unit 126, causes the sensor set 184 of the ego vehicle 123 to generate sensor data 191 and GPS data 192 that is used by the configuration selector 198 to build the report data 193. The configuration selector 198 includes code and routines that, when executed by the onboard unit 126, causes the communication unit 145A to transmit a wireless message to the network optimizer 199 via the network 105 that includes the report data 193. These wireless messages may be transmitted at some regular interval which is determined based on either time or distance traveled by the ego vehicle 123.

In some embodiments, the communication unit 145C receives one or more instances of report data 193 from many different connected vehicles having their own instance of the configuration selector (e.g., the ego vehicle 123 and the remote vehicle 124). The communication unit 145C transmits this report data 193 to the network optimizer 199. The network optimizer 199 include code and routines that are operable, when executed by a processor of the server 107, to cause the processor to use the report data 193 to build the network information database 130 based on the one or more instances of report data 193 that are received by the communication unit 145C.

The network information database 130 is a data structure that stores digital data that describes the following statistical information for different geographic regions: (1) the expected number of vehicles at different times; (2) the average transmission rate for each V2X radio type [e.g., DSRC, LTE, WiFi, mmWave, etc.] at different times; (3) the average overall channel load for each radio type at different times; and (4) other network data such as packet error rate, channel busy ratio, traffic sources, etc. In some embodiments, the expected number of vehicles is limited to the connected vehicles in a geographic region, and does not include un-connected vehicles, i.e., vehicles without a communication unit. In some embodiments, the expected number of vehicles is not limited to vehicles having a configuration selector 198 since, for example, information about the network 105 usage of these vehicles may be obtained by network traffic sniffers of those vehicles that do include a configuration selector 198 and provide report data 193 to the network optimizer 199. In some embodiments, the other network data may also be included in the report data 193 generated by the configuration selectors 198 of the various vehicles. In some embodiments, the statistical information included in the network information database 130 is determined by the statistics analyzer 131 of the network optimizer 199.

In some embodiments, a geographic area (e.g., the state of California) is divided into a plurality of geographic regions (e.g., county-by-county, blocks having the same area similar to a grid system, or some other basis for forming the geographic regions). The network information database 130 is indexed based on the geographic regions such that the data stored in the network information database 130 is retrievable on a geographic region-to-geographic region basis. In some embodiments, each time the network optimizer 199 receives a new instance of report data 193, the network optimizer 199 includes code and routines that are operable, when executed by the processor of the server 107, to cause the processor to: parse out the geographic location (e.g., GPS coordinate) included in the report data 193; determine which geographic region includes this geographic location; and associate the information included in the report data 193 with this particular geographic region.

In some embodiments, the network optimizer 199 includes code and routines that are operable, when executed by the processor of the server 107, to cause the processor to analyze the one or more instances of report data 193 that are received by the network optimizer 199 and determine, for each of the geographic regions, the following information: (1) the amount of traffic generated by non-vehicle wireless devices [i.e., "external channel load"]; and (2) the amount of network traffic generated by controllable vehicles [i.e., "resource demand"].

In some embodiments, a non-vehicle wireless device is a smartphone or some other processor-based communication device that is not a vehicle. Accordingly, in some embodiments the external channel load refers to the network 105 usage of these non-vehicle wireless devices.

In some embodiments, a vehicle is a "controllable vehicle" if the vehicle includes a configuration selector 198. For example, the ego vehicle 123 and the remote vehicle 124 are controllable vehicles, but a vehicle that does not include a configuration selector 198 is not a controllable vehicle. Accordingly, in some embodiments the resource demand refers to the network 105 usage of controllable vehicles such as the ego vehicle 123 and the remote vehicle 124.

In some embodiments, the network optimizer 199 includes code and routines that are operable, when executed by a processor of the server, to cause the processor to analyze the external channel load, resource demand and the other data included in the network information database 130 for each geographic region to generate a set of candidate radio configurations for each geographic region. The set of candidate radio configurations describes two or more networks types that the connected vehicle should use based on its geographic region. Each geographic region has its own set of radio configurations. The configuration data 194 is digital data that describes the set of radio configurations for a particular geographic region.

In some embodiments, the network optimizer 199 includes code and routines that are operable, when executed by the processor of the server 107, to cause the communication unit 145C to transmit configuration data 194 to different particular vehicular endpoints that corresponds to the geographic region where each of these particular vehicular endpoints is located based on the geographic location included in the report data 193 provided by each of these vehicular endpoints. As used herein, the phrase "vehicular endpoints" refers to endpoints of the network 105 that are vehicles and include a configuration selector 198 such as the ego vehicle 123 and the remote vehicle 124.

In some embodiments, the network optimizer 199 includes code and routines that are operable, when executed by the processor of the server 107, to cause the processor to track the geographic location of different vehicular endpoints based on the report data 193 it receives for the different vehicular endpoints. For each instance of report data 193, the network optimizer 199 uses the VIN number included in the report data 193 to retrieve the geographic information included in a last instance of report data 193 that this particular vehicular endpoint provided to the network optimizer 199. By comparing the current geographic information to the prior geographic information, the network optimizer 199 is able to determine if this particular vehicular endpoint has entered a new geographic region. If a particular vehicular endpoint has entered a new geographic region (relative to the last new geographic region it entered), then the network optimizer 199 transmits an instance of configuration data 194 which corresponds to their new geographic region.

In some embodiments, the configuration selector 198 of a particular vehicular endpoint such as the ego vehicle 123 receives the configuration data 194 describing the set of candidate radio configurations. The configuration selector 198 includes code and routines that are operable, when executed by the onboard unit 126, to cause the onboard unit 126 to use the set of candidate radio configurations to select which radio types to use for different vehicle functions. An example advantage and improvement of the embodiments described herein is that the configuration selector 198 is configured so that it does not always select the candidate radio configuration from the set of candidate radio configurations having the highest configuration selection probability.

In some embodiments, the network optimizer 199 includes code and routines that are operable, when executed by a processor of the server 107, to cause the processor to execute one or more of the following steps: divide a geographic area into a plurality of geographic regions, thereby designating the geographic regions for a geographic area; receive multiple instances of report data 193 from multiple vehicular endpoints; for each instance of report data 193, identify based on the GPS data 192 it contains which geographic region it is associated with; build the network information database 130 so that each instance of report data 193 is associated with the geographic region identified in the previous step; for each geographic region, analyze the network information database 130 to determine (1) the external channel load [i.e., the amount of traffic generated by non-vehicle wireless devices] for the geographic region and (2) the resource demand [i.e., the amount of network traffic generated by controllable vehicles] for the geographic region; store digital data describing the external channel load and the resource demand in the network information database 130 so that each geographic region for which report data 193 has been received also has associated with it digital data describing the external channel load and the resource demand determined by the network optimizer 199 based on this report data 193; for each geographic region, analyze the external channel load for this geographic region, the resource demand for each geographic region and the report data 193 for this geographic region to determine a set of candidate radio configurations for this geographic region (which is described by the configuration data 194 for this particular geographic region); for each radio type included in each set of candidate radio configurations, assign a configuration selection probability to this radio type; for each instance of report data 193 received by the network optimizer 199, determine if the vehicular endpoint which transmitted the report data 193 has entered a new geographic region relative to the last instance of report data 193 received from this particular vehicular endpoint and, if the vehicular endpoint has entered a new geographic region, provide this vehicular endpoint with an instance of configuration data 194 that corresponds to the geographic location of the vehicular endpoint as indicated by the GPS data 192 included in the report data 193 that it provided to the network optimizer 199.

The configuration selector 198 of the vehicular endpoint includes code and routines that are operable, when executed by the onboard unit 126, to select a radio based on the set of candidate radio configurations described by the configuration data 194 received from the network optimizer 199. In some embodiments, the configuration selector 198 is configured to periodically select a network type which does not have the highest configuration network probability since otherwise channel congestion would occur if every vehicular endpoint in the geographic region always selected the network type having the highest probability. Globally across all vehicular endpoints the configuration selectors 198 operate using different clocks according to some embodiments so that configuration selectors 198 do not all select the same radio types when they are in the same geographic region.

The network optimizer 199 includes one or more of the following elements: a statistics analyzer 131, an external load estimator 132; and a radio configuration optimizer 133.

The statistics analyzer 131 includes code and routines that are operable, when executed by a processor of the server 107, to cause the processor to analyze one or more instances of report data 193 to determine which geographic regions they describe (e.g., based on the GPS data 192 they include) and determine one or more of the following types of statistical information for each of the different geographic regions indicated by the report data 193: (1) the expected number of vehicles at different times; (2) the average transmission rate for each V2X radio type [e.g., DSRC, LTE, WiFi, mmWave, etc.] at different times; (3) the average overall channel load for each radio type at different times; and (4) other network data such as packet error rate, channel busy ratio, traffic sources, etc.

In some embodiments, the expected number of vehicles is limited to the connected vehicles in a geographic region, and does not include un-connected vehicles, i.e., vehicles without a communication unit. In some embodiments, the expected number of vehicles is not limited to vehicles having a configuration selector 198 since, for example, information about the network 105 usage of these vehicles may be obtained by network traffic sniffers of those vehicles that do include a configuration selector 198 and provide report data 193 to the network optimizer 199. In some embodiments, the other network data may also be included in the report data 193 generated by the configuration selectors 198 of the various vehicles.

In some embodiments, the digital data describing the statistical information outputted by the statistics analyzer 131 is stored in the network information database 130 for each geographic region.

The functionality of the statistics analyzer 131 is described in more detail below with reference to FIG. 7.

The external load estimator 132 includes code and routines that are operable, when executed by a processor of the server 107, to cause the processor to receive the digital data describing the statistical information outputted by the statistics analyzer 131 and generate, based on this statistical information, digital data that describes an estimate of the external channel load for each V2X radio type in each of the geographic regions indicated by the report data 193 (e.g., based on the GPS data 192 they include).

Figure 6:
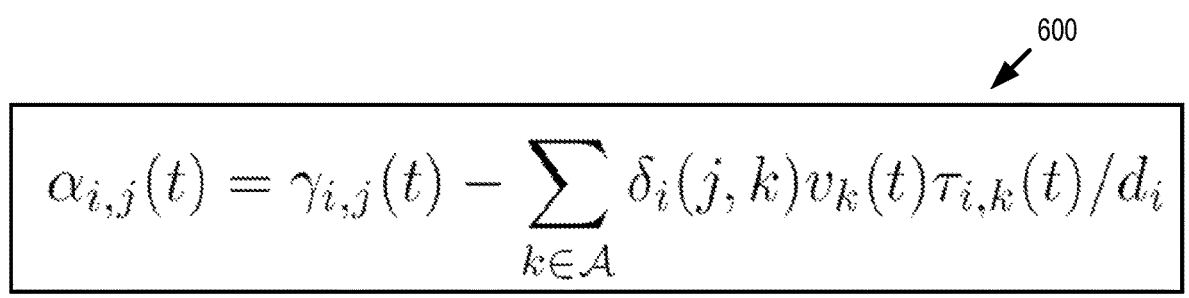

In some embodiments, the external load estimator 132 includes code and routines that describes an analysis 600 depicted in FIG. 6. The analysis 600 includes a set of variables. The statistical information outputted by the statistics analyzer 131 is configured to provide values for the variables of the analysis 600 of the external load estimator 132. In some embodiments, the external load estimator 132 includes code and routines that are operable, when executed by the processor of the server 107, to cause the processor to: receive the digital data describing the statistical information for a set of geographic regions (i.e., those geographic regions indicated by the report data 193) from the statistics analyzer 131; populate the variables of the analysis 600 based on the statistical information; and execute the analysis 600. The output of this analysis 600 is digital data that describes one or more estimates of the external channel load for each V2X radio type in the set of geographic regions (i.e., those geographic regions indicated by the report data 193).

In some embodiments, the digital data describing the external channel load for each V2X radio type in each of the geographic regions is stored in the network information database 130.

The functionality of the external load estimator 132 is described in more detail below with reference to FIG. 8.

Each connected vehicle that receives the service of the network optimizer 199 includes a set of V2X communication option, i.e., a set of V2X channels of various types (e.g., DSRC, mmWave, LTE, etc.), or a set of various V2X radios of various types. The network optimizer 199 generates, for each geographic region, an instance of configuration data 194. Each instance of configuration data 194 includes digital data that describes the V2X communication options and the configuration selection probability value for each of these V2X communication options. The radio configuration optimizer 133 includes code and routines that are operable, when executed by the processor of the server 107, to cause the processor to analyze one or more of the statistical information generated by the statistics analyzer 131 and the external load estimates generated by the external load estimator 132 and generate, based on these inputs, digital data describing configuration selection probabilities for each of these V2X communication options. In this way, the radio configuration optimizer 133 outputs digital data that describes and assigns a configuration selection probability for each radio configuration option included in the configuration data 194.

In some embodiments, the radio configuration optimizer 133 includes code and routines that describes an analysis 901 depicted in FIGS. 9 and 10. The analysis 901 includes a set of variables. In some embodiments, the statistical information outputted by the statistics analyzer 131 is configured to provide values for the variables of the analysis 901 of the radio configuration optimizer 133. In some embodiments, the radio configuration optimizer 133 includes code and routines that are operable, when executed by the processor of the server 107, to cause the processor to: receive the digital data describing the statistical information for a set of geographic regions (i.e., those geographic regions indicated by the report data 193) from the statistics analyzer 131; populate the variables of the analysis 901 based on the statistical information; and execute the analysis 901. The output of this analysis 901 is digital data that describes a value for a configuration selection probability for each of V2X communication options described by the configuration data 194. In some embodiments, the analysis 901 is operable to maximize the residual channel load experienced for each radio type in all the geographic regions indicated by the report data 193 used to generate the statistical information outputted by the statistics analyzer 131.

In some embodiments, the digital data describing the value for the configuration selection probability for each V2X radio type in each of the geographic regions is stored in the network information database 130.

The functionality of the radio configuration optimizer 133 is described in more detail below with reference to FIGS. 9 and 10.

Referring now to FIG. 1B, depicted is a block diagram illustrating an operating environment 101 for a network optimizer 199 according to some embodiments.

The operating environment 101 includes the following elements: the network optimizer 199; and the onboard unit 126. These elements of the operating environment 101 are communicatively coupled to one another by the network 105. Although not depicted in FIG. 1B, in some embodiments the network optimizer 199 is an element of the server 107 and the onboard unit 126 is an element of the ego vehicle 123 or the remote vehicle 124.

The network 105 was described above for FIG. 1A, and so, that description will not be repeated here.

The network optimizer 199 includes the following elements: the network information database 130; the statistics analyzer 131; the external load estimator 132; and the radio configuration optimizer 133. These elements are communicatively coupled to one another via a bus 121. The following elements were described above with reference to FIG. 1A, and so, their descriptions will not be repeated here: the network information database 130; the statistics analyzer 131; the external load estimator 132; and the radio configuration optimizer 133.

The onboard unit 126 includes the following elements: the sensor set 184; the configuration selector 198; the V2X radio 146; a vehicular application 161; and a radio switcher 160. The following elements were described above with reference to FIG. 1A, and so, their descriptions will not be repeated here: the sensor set 184; the configuration selector 198; and the V2X radio 146. The V2X radio 146 is either the V2X radio 146A of the ego vehicle 123 or the V2X radio 146B of the remote vehicle 124.

The vehicular application 161 is any component of a vehicular endpoint (e.g., the ego vehicle 123 or the remote vehicle 124) whose functionality requires it to send or receive packets of digital data via the network 105. For example, the vehicular application 161 is one or more of the following: an infotainment system; a navigation system; an ADAS system of the set of ADAS systems 180; or some other element of the ego vehicle 123 or the remote vehicle 124 that requests or causes wireless messages to be sent or received via the network 105.

The radio switcher 160 is an element of the communication unit 145 that causes the communication unit 145 to switch between various V2X radio channels such as one or more of the following: a cellular channel 147; a WiFi channel 148; a DSRC channel 149; and an "other channel 151" that includes any other type of V2X channel such as, for example, a mmWave communication channel, an LTE-V2X communication channel, an 5G-V2X communication channel, a ITS-G5 communication channel, a ITS-Connect communication channel and any other type of V2X communication channel.

In some embodiments, the configuration selector 198 causes GPS data 192, statistics data 152 and channel measurements data 153 to be transmitted to the network optimizer 199 via the network 105. The GPS data 192, statistics data 152 and channel measurements data 153 are elements of the report data 193.

The GPS data 192 was described above with reference to FIG. 1A, and so that description will not be repeated here.

The statistics data 152 is digital data that describes statistics of channel load for the various V2X network types of the V2X radio 146 as measured by the radio switcher 160. For example, the statistics data 152 describes the average overall channel load for each radio type at different times.

The channel measurements data 153 is digital data that describes channel measurements for the various V2X network types of the V2X radio 146 as measured by the V2X radio 146. For example, the channel measurements data 153 describes: the number of vehicles detected at the geographic location at different times (e.g., based on which BSMs have been received and their unique vehicle identifiers which are usable to count the number of vehicles that are within transmission range of a BSM); the average transmission rate observed for each radio type (e.g., DSRC, LTE, Wi-Fi, mmWave, etc.) at different times; packet error rates for each radio type at different times; channel busy ratios for different radio types at different times; wireless communication traffic observed from smartphones and other non-vehicular endpoints; and wireless communication traffic observed from vehicular endpoints.

In some embodiments, the configuration selector 198 receives configuration data 194 describing a set of candidate radio configurations from the network optimizer 199 via the network 105. The configuration selector 198 selects one of the set of radio configurations and causes the radio switcher 160 to modify which V2X radio channel is used based on this selection. As depicted in this example, the configuration selector 198 has selected the cellular channel 147 based on the configuration data 194. The configuration selector 198 is configured to periodically select a network type (e.g., a V2X radio channel) which does not have the highest configuration network probability since otherwise channel congestion would occur if every vehicle within a geographic region always selected the network type having the highest probability.

In the depicted embodiment, the radio switcher 160 sets radio parameters (e.g., data rate, etc.) for each network type according to the radio configuration selected by the configuration selector 198. The radio switcher 160 also forwards data packets (i.e., the demand for network traffic 156) coming from vehicular applications 161 to the network type selected by the configuration selector 198.

Example Computer System

Figure 2:
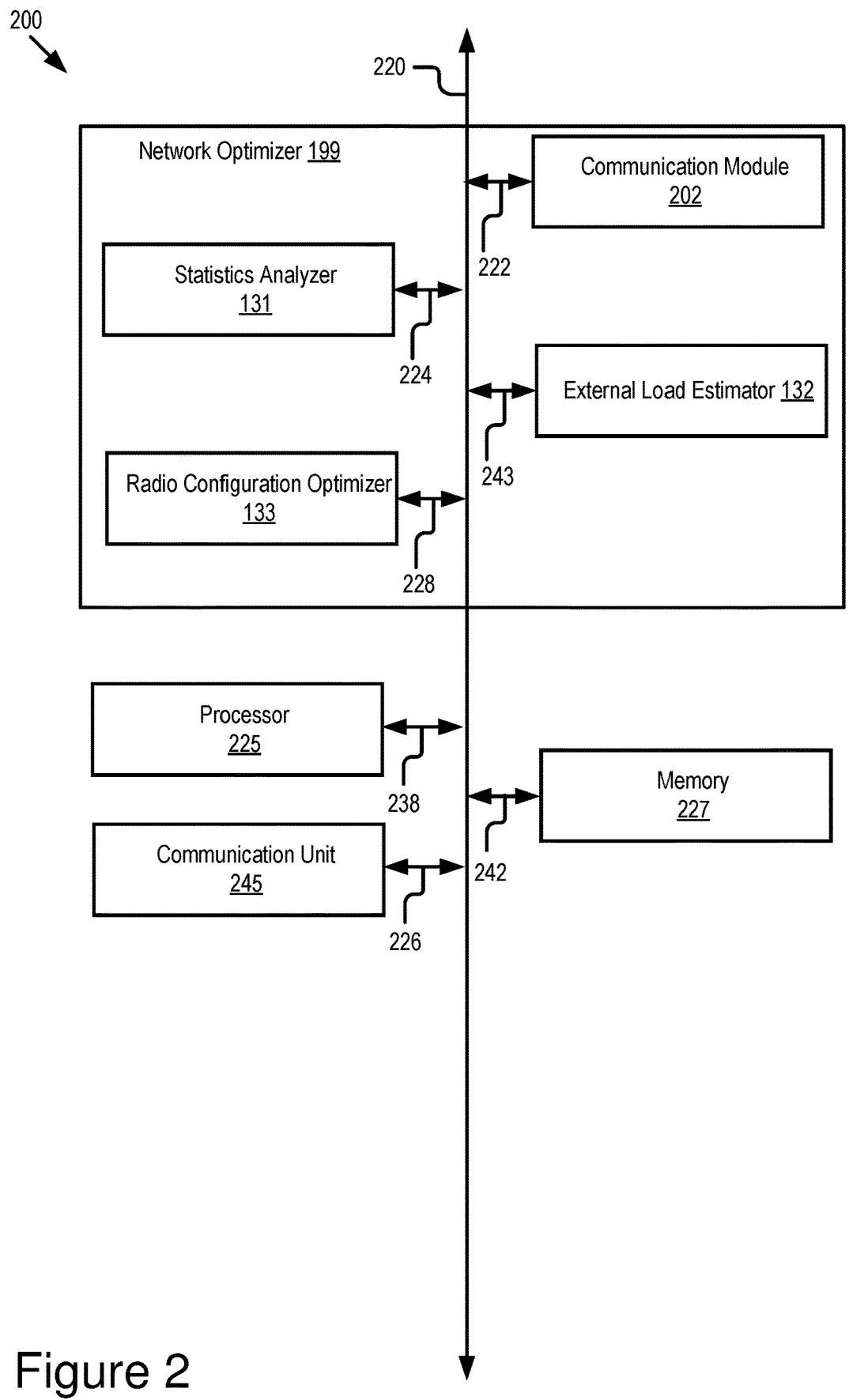
FIG. 2 is a block diagram illustrating an example computer system including the network optimizer according to some embodiments.

Referring now to FIG. 2, depicted is a block diagram illustrating an example computer system 200 including the network optimizer 199 according to some embodiments. In some embodiments, the computer system 200 may include a special-purpose computer system that is programmed to perform one or more steps of one or more of the methods 300, 400, 500 described below with reference to FIGS. 3A, 3B, 4, 5 or the analyses 600, 901 described below with reference to FIGS. 6, 8, 9 and 10.

In some embodiments, the computer system 200 is the server 107. In some embodiments, the computer system 200 is the V2X-connected device 122. In some embodiments, the computer system 200 is an onboard vehicle computer of a vehicle such as the ego vehicle 123 or the remote vehicle 124. In some embodiments, the computer system 200 is an onboard unit 126 of the ego vehicle 123 or the remote vehicle 124. In some embodiments, the computer system 200 is an ECU, head unit or some other processor-based computing device of the ego vehicle 123 or the remote vehicle 124.

The computer system 200 includes one or more of the following elements according to some examples: the network optimizer 199; a processor 225; a communication unit 245; and a memory 227. The components of the computer system 200 are communicatively coupled by a bus 220.

In the illustrated embodiment, the processor 125 is communicatively coupled to the bus 220 via a signal line 238. The communication unit 245 is communicatively coupled to the bus 220 via a signal line 226. The memory 127 is communicatively coupled to the bus 220 via a signal line 242.

The processor 225 provides similar functionality as the processor 125 described above with reference to FIG. 1A, and so, that description will not be repeated here. The communication unit 245 provides similar functionality as the communication unit 245 described above with reference to FIG. 1A, and so, that description will not be repeated here. The memory 227 provides similar functionality as the memory 127 described above with reference to FIG. 1A, and so, that description will not be repeated here.

The memory 227 may store any of the data described above with reference to FIG. 1A or 1B, or below with reference to FIGS. 2-12. The memory 227 may store any data needed for the computer system 200 to provide its functionality.

Figure 5:
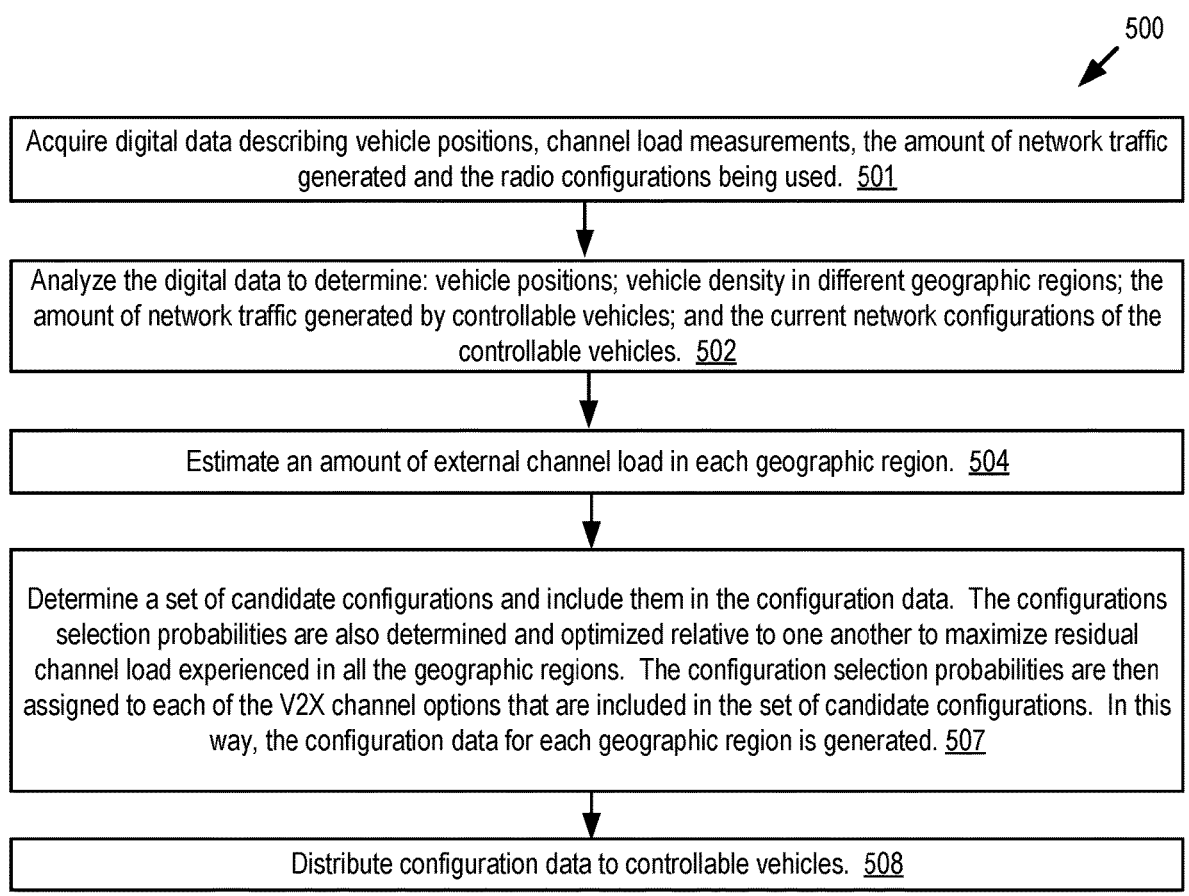
FIG. 5 depicts a method of operation for a network optimizer of a server according to some embodiments.

In some embodiments, the network optimizer 199 include code and routines that are operable, when executed by the processor 225, to execute one or more of the methods 300, 500 depicted in FIGS. 3A, 3B and 5. In some embodiments, the network optimizer 199 includes code and routines that are operable, when executed by the processor 225, to provide one or more of the analyses 600, 901 depicted in FIGS. 6, 9 and 10.

In the illustrated embodiment shown in FIG. 2, the network optimizer 199 includes: a communication module 202; a statistics analyzer 131; an external load estimator 132; and a radio configuration optimizer 133.

The communication module 202 can be software including routines for handling communications between the network optimizer 199 and other components of the operating environment 100 of FIG. 1A or the operating environment 101 of FIG. 1B.

In some embodiments, the communication module 202 can be a set of instructions executable by the processor 225 to provide the functionality described below for handling communications between the network optimizer 199 and other components of the computer system 200. In some embodiments, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the operating environment 100 of FIG. 1A or the operating environment 101 of FIG. 1B. For example, the communication module 202 receives or transmits, via the communication unit 245, some or all of the digital data stored on the memory 127. The communication module 202 may send or receive any of the digital data or messages described above with reference to FIGS. 1A and 1B, or below with reference to FIGS. 2-12, via the communication unit 245.

In some embodiments, the communication module 202 receives data from components of the network optimizer 199 and stores the data in the memory 227 (or a buffer or cache of the memory 227, or a standalone buffer or cache which is not depicted in FIG. 2). For example, the communication module 202 receives the configuration data 194 from the communication unit 245 and stores the configuration data 194 in the memory 227.

In some embodiments, the communication module 202 includes code and routines that are operable, when executed by the processor 225, to cause the processor 225 to step 303 of method 300 described below with reference to FIGS. 3A and 3B. In another example, the communication module 202 includes code and routines that are operable, when executed by the processor 225, to cause the processor 225 to execute step 501 of the method 500 described below with reference to FIG. 5.

In some embodiments, the communication module 202 may handle communications between components of the network optimizer 199.

The statistics analyzer 131 can be software including routines for executing one or more steps of the method 300 described below with reference to FIGS. 3A and 3B or the method 500 descried below with reference to FIG. 5. For example, the statistics analyzer 131 includes code and routines that are operable, when executed by the processor 225, to cause the processor 225 to execute one or more of the following steps of method 300: step 305; and step 307. In another example, the statistics analyzer 131 includes code and routines that are operable, when executed by the processor 225, to cause the processor 225 to execute step 502 of the method 500.

Some of the functionality of the statistics analyzer 131 was described above with reference to FIG. 1A, and so, that description will not be repeated here.

In some embodiments, the statistics analyzer 131 can be stored in the memory 227 of the computer system 200 and can be accessible and executable by the processor 225. The statistics analyzer 131 may be adapted for cooperation and communication with the processor 225 and other components of the computer system 200 via signal line 224.

The external load estimator 132 can be software including routines for executing one or more steps of the method 300 described below with reference to FIGS. 3A and 3B or the method 500 descried below with reference to FIG. 5. For example, the external load estimator 132 includes code and routines that are operable, when executed by the processor 225, to cause the processor 225 to execute one or more of the following steps of method 300: step 308; and step 309. In another example, the external load estimator 132 includes code and routines that are operable, when executed by the processor 225, to cause the processor 225 to execute step 504 of the method 500.

In some embodiments, the external load estimator 132 includes code and routines that are operable to provide the analysis 600 described below with reference to FIGS. 6 and 8.

Some of the functionality of the external load estimator 132 was described above with reference to FIG. 1A, and so, that description will not be repeated here.

In some embodiments, the external load estimator 132 can be stored in the memory 227 of the computer system 200 and can be accessible and executable by the processor 225. The external load estimator 132 may be adapted for cooperation and communication with the processor 225 and other components of the computer system 200 via signal line 243.

The radio configuration optimizer 133 can be software including routines for executing one or more steps of the method 300 described below with reference to FIGS. 3A and 3B or the method 500 descried below with reference to FIG. 5. For example, the radio configuration optimizer 133 includes code and routines that are operable, when executed by the processor 225, to cause the processor 225 to execute one or more of the following steps of method 300: step 301; step 310; step 312; and step 314. In another example, the radio configuration optimizer 133 includes code and routines that are operable, when executed by the processor 225, to cause the processor 225 to execute one or more of the following steps of method 500: step 507 and step 508.

In some embodiments, the radio configuration optimizer 133 includes code and routines that are operable to provide the analysis 901 described below with reference to FIGS. 9 and 10.

Some of the functionality of the radio configuration optimizer 133 was described above with reference to FIG. 1A, and so, that description will not be repeated here.

In some embodiments, the radio configuration optimizer 133 can be stored in the memory 227 of the computer system 200 and can be accessible and executable by the processor 225. The radio configuration optimizer 133 may be adapted for cooperation and communication with the processor 225 and other components of the computer system 200 via signal line 228.

Example Methods

Referring now to FIGS. 3A and 3B, depicted is a method 300 for configuring a channel selection of a V2X radio 146 according to some embodiments. The steps of the method 300 are executable in any order, and not necessarily the order depicted in FIGS. 3A and 3B.

At step 301, a geographic area is divided into a plurality of geographic regions, thereby designating the geographic regions for a geographic area.

At step 303, multiple instances of report data 193 are received from multiple vehicular endpoints.

At step 305, for each instance of report data 193, a geographic region associated with report data 193 is identified.

At step 307, the network information database 130 is built so that each instance of report data 193 is associated with the geographic region identified in step 305.

At step 308, for each geographic region, the network information database 130 is analyzed to determine (1) the external channel load [i.e., the amount of traffic generated by non-vehicle wireless devices] for the geographic region and (2) the resource demand [i.e., the amount of network traffic generated by controllable vehicles] for the geographic region.

At step 309, digital data describing the external channel load and the resource demand is stored in the network information database 130 so that each geographic region for which report data 193 has been received also has associated with it digital data describing the external channel load and the resource demand determined by the network optimizer 199 based on this report data 193.

At step 310, the following are analyzed to determine a set of candidate radio configurations for each geographic region (which is described by the configuration data 194 for a particular geographic region): the external channel load for this geographic region; the resource demand for this geographic region; and the report data 193 for this geographic region.

At step 312, for each radio type included in each set of candidate radio configurations, a configuration selection probability is assigned.

Referring now to FIG. 3B, at step 314; for each instance of report data 193 received by the network optimizer 199, a determination is made regarding whether the vehicular endpoint which transmitted the report data 193 has entered a new geographic region relative to the last instance of report data 193 received from this particular vehicular endpoint. If the vehicular endpoint has entered a new geographic region, this vehicular endpoint is provided with an instance of configuration data 194 (e.g., via the network 105) that corresponds to the geographic location of the vehicular endpoint as indicated by the GPS data 192 included in the report data 193 that it provided to the network optimizer 199.

Referring to FIG. 4, depicted is a method 400 of operation for a configuration selector 198 of a vehicular endpoint (e.g., the ego vehicle 123 or the remote vehicle 124) according to some embodiments.

At step 402, a determination is made regarding whether the vehicular endpoint that includes the configuration selector 198 has entered a new geographic region. If the determination is positive at step 402, then the method 400 proceeds to step 408. If the determination is negative at step 402, then the method 400 proceeds to step 404.

At step 404, a determination is made regarding whether a time threshold has been satisfied since the last time the configuration selector modified the setting of the radio switcher 160 of the vehicular endpoint. The time threshold may be defined by digital data stored in a memory (e.g., the memory 127) if the vehicular endpoint. If the determination is positive at step 404, then the method 400 proceeds to step 408. If the determination is negative at step 402, then the method 400 proceeds to step 406.

At step 406, a determination is made regarding whether a new instance of configuration data 194 has been received from the network optimizer 199. If the determination is negative at step 406, then the method 400 proceeds to step 402. If the determination is positive at step 406, then the method 400 proceeds to step 408.

At step 408, one of the candidate configurations for the V2X radio 146 is selected from those described by the most recently received instance of configuration data 194.

In some embodiments, step 408 is configured so that V2X radio channel having the highest configuration selection probability is not always selected. For example, a clock of the vehicular endpoint may provide an input to the configuration selector 198, and the configuration selector 198 may include code and routines that are operable, when executed by the processor 125, to cause the processor 125 to select an instance when a V2X radio channel having the second highest configuration selection probability is selected at step 408. The various vehicular endpoints include different clocks or clocks having different time settings so that each of the vehicular endpoints does not select the V2X radio channel having the second highest configuration selection probability at the same time.

At step 410, the setting of the radio switcher 160 is updated based on the V2X radio channel selected at step 408.

Referring now to FIG. 5, depicted is a block diagram illustrating a method 500 of operation for the network optimizer 199 of the server 107 according to some embodiments.

At step 501, digital data describing vehicle positions (e.g., the GPS data 192), channel load measurements (e.g., the channel measurements data 153), the amount of network traffic generated (e.g., the statistics data 152) and the radio configurations being used by one or more vehicular endpoints is acquired (e.g., also the statistics data 152). For example, the report data 193 is generated by one or more configuration selectors 198 of one or more vehicular endpoints; this report data 193 is then transmitted to and acquired by the network optimizer 199 of the server 107.

At step 502, the digital data (e.g., the report data 193) is analyzed to determine one or more of the following: the positions or geographic locations of the vehicles; the vehicle density in different geographic regions; the amount of network traffic being generated by controllable vehicles (e.g., those vehicular endpoints having a configuration selector 198 installed in them); and the current network configurations of the controllable vehicles.

At step 504, the external channel load is estimated for each geographic region.

At step 507, a set of candidate configurations are determined. The configurations selection probabilities are also determined and optimized relative to one another to maximize residual channel load experienced in all the geographic regions. The configuration selection probabilities are then assigned to each of the V2X channel options that are included in the set of candidate configurations. In this way, the configuration data 194 for each geographic region is generated.

At step 408, the configuration data 194 is transmitted to the vehicular endpoints via the network 105 based on the geographic locations of these vehicular endpoints. For example, each geographic region has its own instance of configuration data 194, and each vehicular endpoint receives the configuration data 194 for the geographic region that includes the GPS coordinate described by their most recently reported instance of report data 193.

Referring now to FIGS. 6-10, described is an analysis provided by the embodiments described herein. FIGS. 6-10 each relate to one another and assume that a particular configuration selected from the set of radio configurations (such as those described by the configuration data 194) describes a single type of radio that should be used to transmit data packets via the network 105, and that given that vehicular endpoints (each of which are connected vehicles) include n types of common network interfaces, the network optimizer 199 needs to optimize n pieces of probabilities $p_1, \ldots, p_n$, where $\Sigma_{1 \leq i \leq n} p_i = 1$.

Referring now to FIG. 6, depicted is a block diagram illustrating an example analysis 600 provided by the external load estimator 132 of the network optimizer 199 according to some embodiments.

Referring now to FIG. 7, a block diagram 700 is shown depicting an example of the statistical information generated by the statistics analyzer 131 according to some embodiments.

In some embodiments, the statistics analyzer 131 analyzes the report data 193 to determine values for the variables depicted in FIG. 7. These variables are then inputted to the external load estimator 132.

Referring now to FIG. 8, a block diagram 800 is shown depicting the analysis 600 of FIG. 6 and how the statistical information generated by the statistics analyzer 131 is inputted in this analysis 600. The analysis 600 itself is also further defined by FIG. 8 according to some embodiments.

Referring now to FIG. 9, a block diagram 900 is shown depicting the functionality of the radio configuration optimizer 133 and an analysis 901 provided by the radio configuration optimizer 133 according to some embodiments.

Referring to FIG. 10, a block diagram 1000 is shown depicting the application of the analysis 901 according to some embodiments.

In some embodiments, the analysis 901 is performed by the radio configuration optimizer 133 to achieve the goal of maximizing the residual channel load experienced for each radio type included in all the geographic regions.

Referring now to FIG. 11, depicted is a block diagram illustrating an example of the BSM data 197 according to some embodiments.

The regular interval for transmitting BSMs may be user configurable. In some embodiments, a default setting for this interval may be transmitting the BSM every 0.10 seconds or substantially every 0.10 seconds.

A BSM is broadcasted over the 5.9 GHz DSRC band. DSRC range may be substantially 1,000 meters. In some embodiments, DSRC range may include a range of substantially 100 meters to substantially 1,000 meters. DSRC range is generally 300 to 500 meters depending on variables such as topography and occlusions between DSRC-equipped endpoints. In some embodiments, one or more of the vehicles 123, 124 depicted in FIG. 1A and the V2X-connected device 122 depicted in FIG. 1A are DSRC-equipped endpoints.

Referring now to FIG. 12, depicted is a block diagram illustrating an example of BSM data 197 according to some embodiments.

A BSM may include two parts. These two parts may include different BSM data 197 as shown in FIG. 12.

Part 1 of the BSM data 197 may describe one or more of the following: the GPS data 192 of the vehicle; vehicle heading; vehicle speed; vehicle acceleration; vehicle steering wheel angle; and vehicle size.

Part 2 of the BSM data 197 may include a variable set of data elements drawn from a list of optional elements. Some of the BSM data 197 included in Part 2 of the BSM are selected based on event triggers, e.g., anti-locking brake system ("ABS") being activated may trigger BSM data 197 relevant to the ABS system of the vehicle.

In some embodiments, some of the elements of Part 2 are transmitted less frequently in order to conserve bandwidth.

In some embodiments, the BSM data 197 included in a BSM includes current snapshots of a vehicle.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
receiving, by a connected vehicle, configuration data describing a set of candidate vehicle-to-anything (V2X) channels of a V2X radio of the connected vehicle;
determining configuration selection probabilities describing a likelihood that particular candidate V2X channels of the set will be selected based in part on a resource demand as determined by an amount of network traffic generated by controllable vehicles within a geographic region that includes the connected vehicle;
selecting a V2X channel from the set that does not have a highest likelihood of being selected based on the configuration selection probabilities; and
configuring the V2X radio of the connected vehicle to transmit data packets using the selected V2X channel.

2. The method of claim 1, wherein configuration selection probabilities are operable to maximize a residual channel load experienced in a plurality of geographic regions for all the V2X channels supported by the V2X radio.

3. The method of claim 1, wherein the configuration selection probabilities are determined based in part on an amount of traffic generated by non-vehicle wireless devices within the geographic region that includes the connected vehicle.

4. The method of claim 1, wherein the connected vehicle sends its location to a network optimizer and the configuration data is received from the network optimizer responsive to the connected vehicle entering the geographic region.

5. The method of claim 1, wherein the connected vehicle is a controllable vehicle because the connected vehicle includes an onboard unit having a configuration selector that is operable to execute the method when executed by the onboard unit.

6. The method of claim 1, wherein the connected vehicle is an automated vehicle.

7. The method of claim 1, wherein the connected vehicle is a highly automated vehicle that operates itself without human intervention.

8. The method of claim 1, wherein the selected V2X channel is selected from a group that includes one of the following: a wireless fidelity (WiFi) channel; a 3G channel; a 4G channel; a Long-Term Evolution (LTE) channel; a millimeter wave communication channel; a Dedicated Short-Range Communication (DSRC) channel; and an LTE-V2X channel.

9. The method of claim 1, wherein the selected V2X channel is selected from a group that does not include one of the following: a WiFi channel; a 3G channel; a 4G channel; an LTE channel; a millimeter wave communication channel; a DSRC channel; and an LTE-V2X channel.

10. A system comprising:
a processor communicatively coupled to a non-transitory memory that stores computer code that is operable, when executed by the processor, to cause the processor to:
receive configuration data describing a set of candidate vehicle-to-anything (V2X) channels of a V2X radio of a connected vehicle;
determine configuration selection probabilities describing a likelihood that particular candidate V2X channels of the set will be selected based in part on a resource demand as determined by an amount of network traffic generated by controllable vehicles within a geographic region that includes the connected vehicle;
selecting a V2X channel from the set that does not have a highest likelihood of being selected based on the configuration selection probabilities; and
configuring the V2X radio of the connected vehicle to transmit data packets using the selected V2X channel.

11. The system of claim 10, wherein configuration selection probabilities are operable to maximize a residual channel load experienced in a plurality of geographic regions for all the V2X channels supported by the V2X radio.

12. The system of claim 10, wherein the configuration selection probabilities are determined based in part on an amount of traffic generated by non-vehicle wireless devices within the geographic region that includes the connected vehicle.

13. The system of claim 10, wherein the controllable vehicles each include a configuration selector.

14. The system of claim 10, wherein the connected vehicle is a controllable vehicle because the connected vehicle includes a configuration selector that is described by the computer code.

15. The system of claim 10, wherein the connected vehicle is an automated vehicle.

16. The system of claim 10, wherein the connected vehicle is a highly automated vehicle that operates itself without human intervention.

17. A computer program product comprising a non-transitory memory storing instructions that, when executed by one or more processors, cause the one or more processors to perform operations comprising:
receiving configuration data describing a set of candidate vehicle-to-anything (V2X) channels of a V2X radio of a connected vehicle;
determining configuration selection probabilities describing a likelihood that particular candidate V2X channels of the set will be selected based in part on a resource demand as determined by an amount of network traffic generated by controllable vehicles within a geographic region that includes the connected vehicle;
selecting a V2X channel from the set that does not have a highest likelihood of being selected based on the configuration selection probabilities; and
configuring the V2X radio of the connected vehicle to transmit data packets using the selected V2X channel.

18. The computer program product of claim 17, wherein configuration selection probabilities are operable to maximize a residual channel load experienced in a plurality of geographic regions for all the V2X channels supported by the V2X radio.

19. The computer program product of claim 17, wherein the configuration selection probabilities are determined based in part on an amount of traffic generated by non-vehicle wireless devices within the geographic region that includes the connected vehicle.

20. The computer program product of claim 17, wherein the connected vehicle sends its location to a network optimizer and the configuration data is received from the network optimizer responsive to the connected vehicle entering the geographic region.

* * * * *